(12) United States Patent
Fujisawa et al.

(10) Patent No.: US 12,710,372 B2
(45) Date of Patent: Aug. 18, 2026

(54) DETECTION DEVICE

(71) Applicant: Magnolia White Corporation, Tokyo (JP)

(72) Inventors: Akihiko Fujisawa, Tokyo (JP); Takanori Tsunashima, Tokyo (JP); Kaoru Ito, Tokyo (JP); Shiori Tezen, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 76 days.

(21) Appl. No.: 18/644,439

(22) Filed: Apr. 24, 2024

(65) Prior Publication Data

US 2024/0361250 A1 Oct. 31, 2024

(30) Foreign Application Priority Data

Apr. 26, 2023 (JP) ................................ 2023-072245

(51) Int. Cl.
*G01N 21/84* (2006.01)

(52) U.S. Cl.
CPC .................................... *G01N 21/84* (2013.01)

(58) Field of Classification Search
CPC ........... G01N 21/84; G01N 21/59; G01J 3/46; G08B 17/12; H04N 7/18; H04N 5/335
See application file for complete search history.

(56) References Cited

FOREIGN PATENT DOCUMENTS

JP 2018-033430 A 3/2018
WO WO-2020137129 A1 * 7/2020 ........... A61B 5/1172

* cited by examiner

*Primary Examiner* — Georgia Y Epps
*Assistant Examiner* — Don J Williams
(74) *Attorney, Agent, or Firm* — K&L Gates LLP

(57) ABSTRACT

According to an aspect, a detection device includes: a planar detection device including photodetection elements arranged in a planar configuration; a light source device disposed so as to face the planar detection device; and a light-transmitting placement substrate that is disposed between the planar detection device and the light source device and configured to allow objects to be placed thereon. The planar detection device includes: a detection area where sensor pixels including the photodetection elements are arranged in a first direction and a second direction orthogonal to the first direction; a drive circuit configured to simultaneously supply drive signals to the sensor pixels arranged in the first direction; and a selection circuit configured to select a detection signal for each of the sensor pixels arranged in the second direction. The detection area is divided in the second direction into detection blocks. The drive circuit is provided for each detection block.

7 Claims, 19 Drawing Sheets

FIG.2

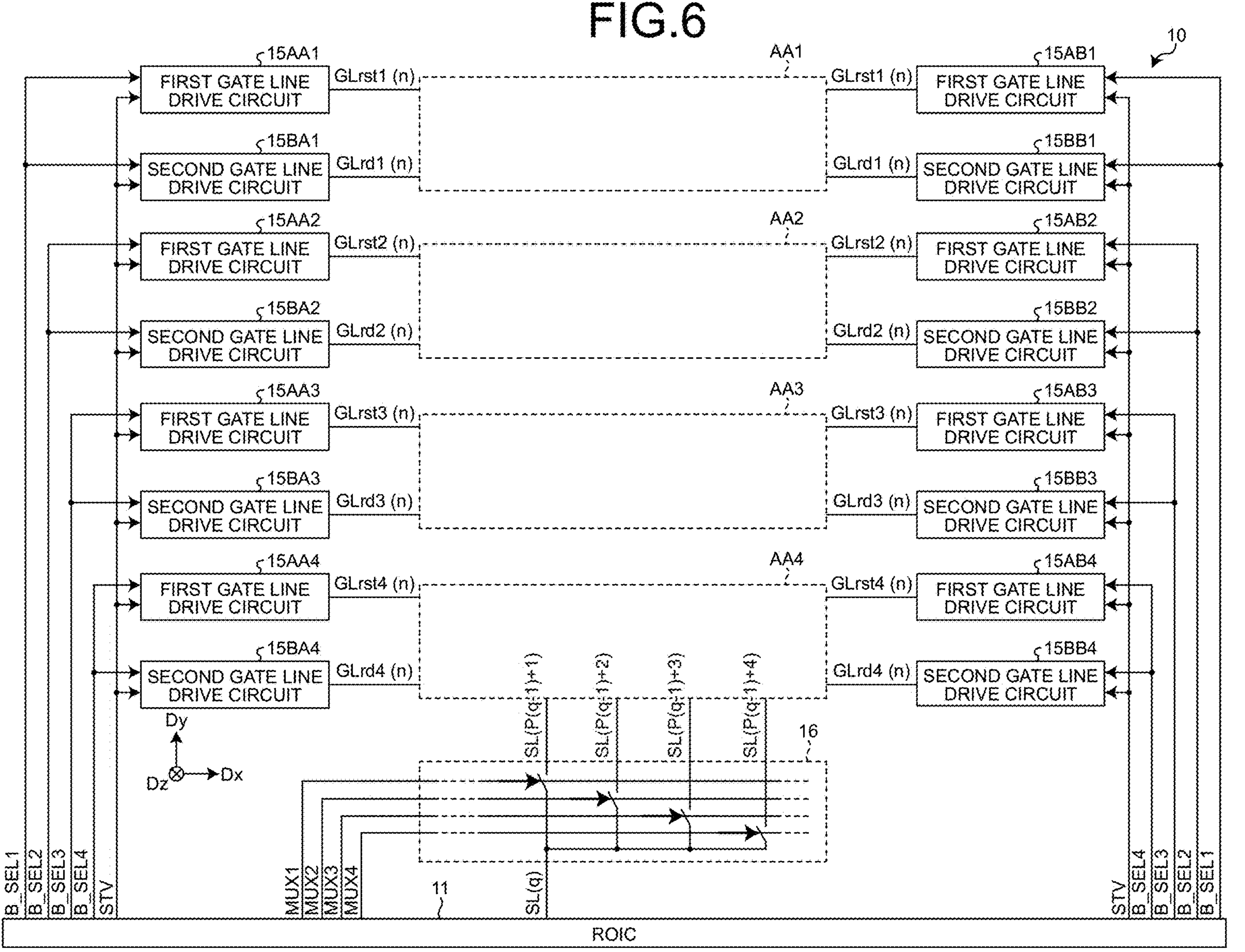
FIG.6
10
15AA1
FIRST GATE LINE DRIVE CIRCUIT
15BA1
SECOND GATE LINE DRIVE CIRCUIT
15AA2
FIRST GATE LINE DRIVE CIRCUIT
15BA2
SECOND GATE LINE DRIVE CIRCUIT
15AA3
FIRST GATE LINE DRIVE CIRCUIT
15BA3
SECOND GATE LINE DRIVE CIRCUIT
15AA4
FIRST GATE LINE DRIVE CIRCUIT
15BA4
SECOND GATE LINE DRIVE CIRCUIT
15AB1
FIRST GATE LINE DRIVE CIRCUIT
15BB1
SECOND GATE LINE DRIVE CIRCUIT
15AB2
FIRST GATE LINE DRIVE CIRCUIT
15BB2
SECOND GATE LINE DRIVE CIRCUIT
15AB3
FIRST GATE LINE DRIVE CIRCUIT
15BB3
SECOND GATE LINE DRIVE CIRCUIT
15AB4
FIRST GATE LINE DRIVE CIRCUIT
15BB4
SECOND GATE LINE DRIVE CIRCUIT
GLrst1 (n)
GLrd1 (n)
GLrst2 (n)
GLrd2 (n)
GLrst3 (n)
GLrd3 (n)
GLrst4 (n)
GLrd4 (n)
AA1
AA2
AA3
AA4
SL(P(q-1)+1)
SL(P(q-1)+2)
SL(P(q-1)+3)
SL(P(q-1)+4)
16
Dy
Dx
Dz
B_SEL1
B_SEL2
B_SEL3
B_SEL4
STV
MUX1
MUX2
MUX3
MUX4
11
SL(q)
ROIC STV
B_SEL1
B_SEL2
B_SEL3
B_SEL4
MUX1
MUX2
MUX3
MUX4
150 ms
250 ms
400 ms
1.6 s
6.4 s STV
B_SELo
MUX1
MUX2
Prst
(40 ms)
Pex
(130 ms)
Pdet
(40 ms)
P_D/O
(150 ms)
P_MUX
(250 ms)
P_1F/16
(400 ms)

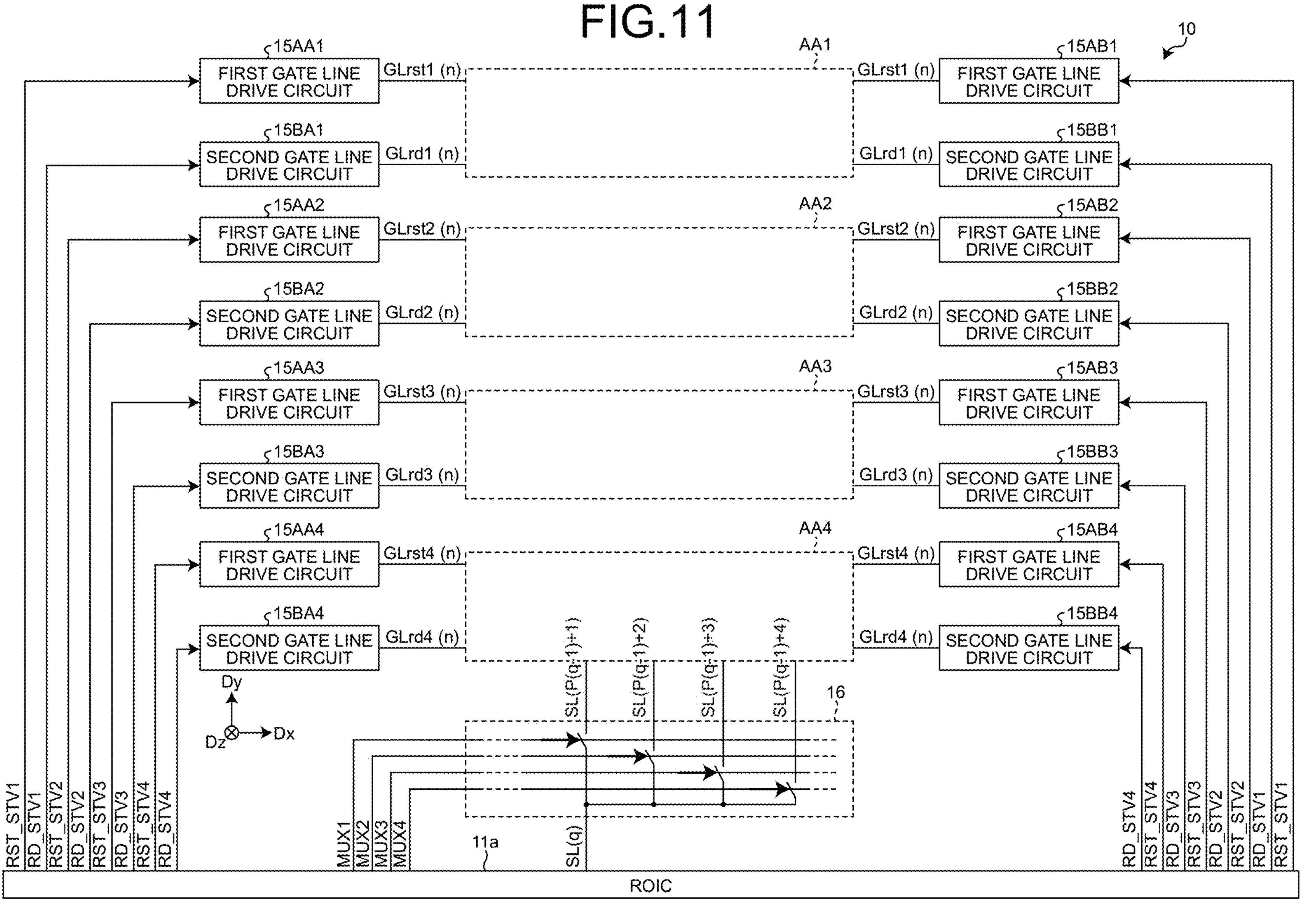
FIG.11
10
15AA1
FIRST GATE LINE DRIVE CIRCUIT
15BA1
SECOND GATE LINE DRIVE CIRCUIT
15AA2
FIRST GATE LINE DRIVE CIRCUIT
15BA2
SECOND GATE LINE DRIVE CIRCUIT
15AA3
FIRST GATE LINE DRIVE CIRCUIT
15BA3
SECOND GATE LINE DRIVE CIRCUIT
15AA4
FIRST GATE LINE DRIVE CIRCUIT
15BA4
SECOND GATE LINE DRIVE CIRCUIT
15AB1
FIRST GATE LINE DRIVE CIRCUIT
15BB1
SECOND GATE LINE DRIVE CIRCUIT
15AB2
FIRST GATE LINE DRIVE CIRCUIT
15BB2
SECOND GATE LINE DRIVE CIRCUIT
15AB3
FIRST GATE LINE DRIVE CIRCUIT
15BB3
SECOND GATE LINE DRIVE CIRCUIT
15AB4
FIRST GATE LINE DRIVE CIRCUIT
15BB4
SECOND GATE LINE DRIVE CIRCUIT
GLrst1 (n)
GLrd1 (n)
GLrst2 (n)
GLrd2 (n)
GLrst3 (n)
GLrd3 (n)
GLrst4 (n)
GLrd4 (n)
AA1
AA2
AA3
AA4
Dy
Dz
Dx
SL(P(q-1)+1)
SL(P(q-1)+2)
SL(P(q-1)+3)
SL(P(q-1)+4)
16
RST_STV1
RD_STV1
RST_STV2
RD_STV2
RST_STV3
RD_STV3
RST_STV4
RD_STV4
MUX1
MUX2
MUX3
MUX4
11a
SL(q)
ROIC RST_STV1
RD_STV1
RST_STV2
RD_STV2
RST_STV3
RD_STV3
RST_STV4
RD_STV4
MUX1
MUX2
MUX3
MUX4
150 ms
250 ms
400 ms
1.6 s
6.4 s

DETECTION DEVICE

CROSS-REFERENCE TO RELATED APPLICATION

This application claims the benefit of priority from Japanese Patent Application No. 2023-072245 filed on Apr. 26, 2023, the entire contents of which are incorporated herein by reference.

BACKGROUND

1. Technical Field

What is disclosed herein relates to a detection device.

2. Description of the Related Art

Japanese Patent Application Laid-open Publication No. 2018-033430 (JP-A-2018-033430) discloses a biosensor that includes a photosensor, a culture vessel placed on top of an imaging surface of the photosensor, and a point light source disposed above the culture vessel. In the biosensor of JP-A-2018-033430, light emitted from the point light source passes through a culture medium and a colony of microorganisms such as bacteria (objects to be detected) on the culture medium in the culture vessel, and enters the photosensor.

Such a detection device is required to detect the colony in a wider area by combining a readout integrated circuit (ROIC) with a planar detection device including a larger detection area. However, low-cost ROICs may not be employed due to hardware constraints such as limitations in the number of simultaneously coupleable signal lines or buffer size.

For the foregoing reasons, there is a need for a detection device capable of avoiding the hardware constraints of the ROICs.

SUMMARY

According to an aspect, a detection device includes: a planar detection device including a plurality of photodetection elements arranged in a planar configuration; a light source device disposed so as to face the planar detection device; and a light-transmitting placement substrate that is disposed between the planar detection device and the light source device and configured to allow a plurality of objects to be detected to be placed thereon. The planar detection device includes: a detection area in which a plurality of sensor pixels including the photodetection elements are arranged in a first direction and a second direction orthogonal to the first direction; a drive circuit configured to simultaneously supply drive signals to the sensor pixels arranged in the first direction; and a selection circuit configured to select a detection signal for each of the sensor pixels arranged in the second direction. The detection area is divided in the second direction into a plurality of detection blocks. The drive circuit is provided for each of the detection blocks.

BRIEF DESCRIPTION OF THE DRAWINGS

FIG. 2 is a schematic sectional view of the detection device according to the first embodiment;

FIG. 6 is a diagram illustrating an exemplary coupling configuration between the optical sensor and the detection circuit according to the first embodiment;

FIG. 11 is a diagram illustrating an exemplary coupling configuration between the optical sensor and a detection circuit according to a second embodiment.

DETAILED DESCRIPTION

Figure 1:
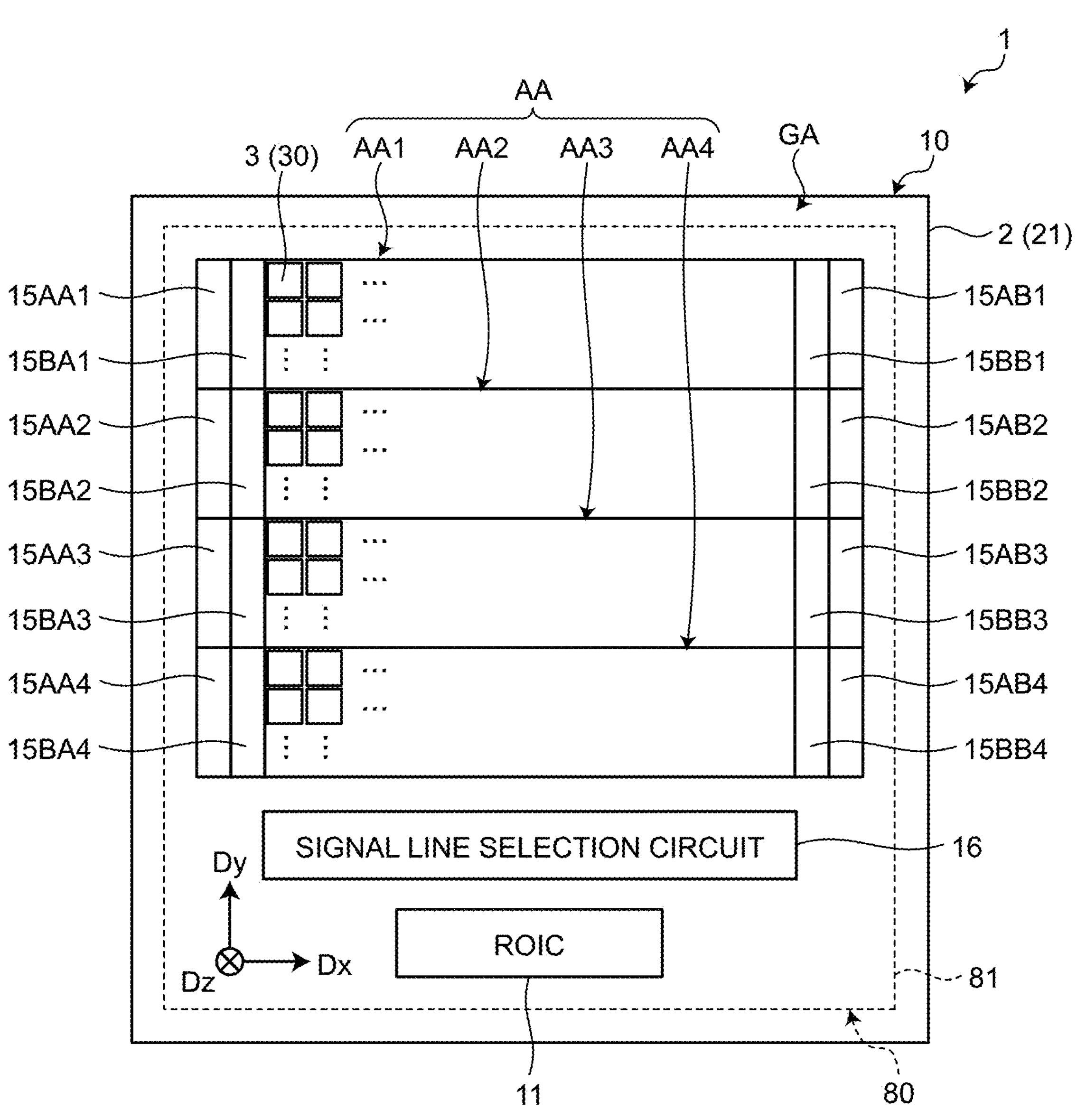
FIG. 1 is a plan view schematically illustrating a detection device according to a first embodiment.

The following describes modes (embodiments) for carrying out the present disclosure in detail with reference to the drawings. The present disclosure is not limited to the description of the embodiments given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the present disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the present disclosure and the drawings, and detailed description thereof may not be repeated where appropriate.

In the present specification and claims, in expressing an aspect of disposing another structure on or above a certain structure, a case of simply expressing "on" includes both a case of disposing the other structure immediately on the certain structure so as to contact the certain structure and a case of disposing the other structure above the certain structure with still another structure interposed therebetween, unless otherwise specified.

First Embodiment

Figure 2:
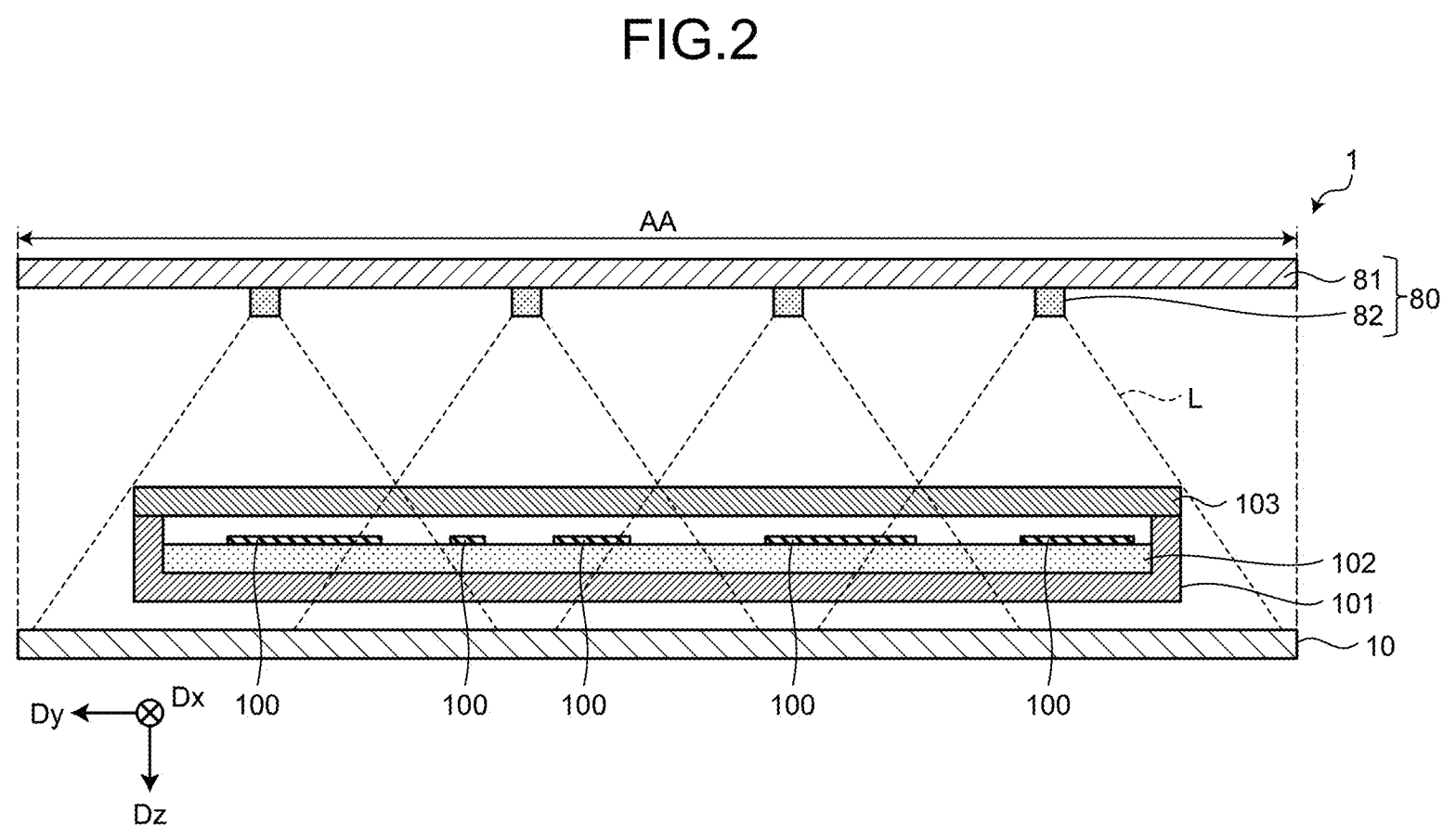

FIG. 1 is a plan view schematically illustrating a detection device according to a first embodiment. FIG. 2 is a schematic sectional view of the detection device according to the first embodiment. In the present disclosure, a detection device 1 is what is called a biosensor that detects micro-objects such as bacteria as objects to be detected 100. The detection device 1 includes an optical sensor 10, a detection circuit 11, a control circuit 70, and a light source device 80.

The optical sensor 10 is a planar detection device that includes a plurality of photodiodes (photodetection elements) 30 arranged in a planar configuration. The optical sensor 10 includes detection blocks AA1, AA2, AA3, and AA4 each provided with a plurality of sensor pixels 3 on an array substrate 2 that is formed using a substrate 21 as a base.

A first direction Dx is one direction in a plane parallel to the substrate 21. A second direction Dy is one direction in the plane parallel to the substrate 21 and is a direction orthogonal to the first direction Dx. A third direction Dz is a direction orthogonal to the first direction Dx and the second direction Dy and is a direction normal to a principle surface of the substrate 21. The term "plan view" refers to a positional relation when viewed from a direction orthogonal to the substrate 21.

In the present disclosure, the detection device 1 generates an image for one frame by combining images acquired in the respective detection blocks AA1, AA2, AA3, and AA4, assuming the detection blocks AA1, AA2, AA3, and AA4 arranged in the second direction Dy as one detection area AA. In other words, in the present disclosure, the optical sensor 10 has a configuration where the one detection area AA is divided into the detection blocks AA1, AA2, AA3, and AA4. In the following description, the detection blocks AA1, AA2, AA3, and AA4 may be referred to as detection blocks AAo (o is an integer from 1 to O, where O is the total number of the detection blocks).

The sensor pixels 3 are arrayed in the first direction Dx and the second direction Dy to be arranged in a matrix having a row-column configuration. Each of the sensor pixels 3 is an optical sensor including a corresponding one of the photodiodes 30 as a photodetection element. Each of the photodiodes 30 outputs an electrical signal (potential) corresponding to light emitted thereto. More specifically, the photodiode 30 is an organic photodiode (OPD) using an organic semiconductor or a positive-intrinsic-negative (PIN) photodiode.

In the light source device 80, a light-emitting element 82 is provided on a light source substrate 81 that is provided so as to face the array substrate 2 of the optical sensor 10 in the third direction Dz. The light-emitting element 82 includes a light-emitting diode (LED), for example. FIG. 2 illustrates a configuration where a plurality of the light-emitting elements 82 are provided in an area corresponding to the detection area AA of the optical sensor 10.

In the present disclosure, the detection device 1 includes a placement substrate 101 configured to allow the objects to be detected 100 to be placed thereon, and a cover member 103. The placement substrate 101 and the cover member 103 are light-transmitting plate-like members formed of glass, for example. Specifically, the placement substrate 101 and the cover member 103 are a Petri dish, for example.

The objects to be detected 100 are cultured on a culture medium 102 provided on the placement substrate 101. The cover member 103 is provided on the placement substrate 101, and the objects to be detected 100 are placed between the optical sensor 10 and the light source device 80. More specifically, the detection device 1 has a configuration in which the placement substrate 101 and the cover member 103 (objects to be detected 100), and the light source device 80 are placed in this order above the optical sensor 10.

Light L emitted from the light-emitting elements 82 passes through the placement substrate 101, the culture medium 102, and the cover member 103 and is applied to the detection area AA. The intensity of light received by the sensor pixels 3 (hereinafter also referred to as "received light intensity") differs between an area overlapping the object to be detected 100 and an area not overlapping the object to be detected 100. The optical sensor 10 can capture an image of a colony (objects to be detected 100) on the culture medium 102 by differences in the received light intensity that differs between the sensor pixels 3.

The objects to be detected 100 are not limited to the bacteria and may be other micro-objects such as cells. The detection device 1 is not limited to the biosensor and may be configured as, for example, a fingerprint detection device that detects a fingerprint or a vein detection device that detects a vascular pattern of, for example, veins. In this case, the object to be detected 100 may be a living body such as a finger, a palm, or a wrist.

A peripheral area GA outside the detection blocks AAo of the substrate 21 is provided with first gate line drive circuits 15AA1, 15AA2, 15AA3, 15AA4, 15AB1, 15AB2, 15AB3, and 15AB4, second gate line drive circuits 15BA1, 15BA2, 15BA3, 15BA4, 15BB1, 15BB2, 15BB3, and 15BB4, and a signal line selection circuit 16.

The first gate line drive circuits 15AA1, 15AA2, 15AA3, and 15AA4, the first gate line drive circuits 15AB1, 15AB2, 15AB3, and 15AB4, the second gate line drive circuits 15BA1, 15BA2, 15BA3, and 15BA4, and the second gate line drive circuits 15BB1, 15BB2, 15BB3, and 15BB4 are provided correspondingly to the detection blocks AA1, AA2, AA3, and AA4, respectively. In the following description, the first gate line drive circuits 15AA1, 15AA2, 15AA3, 15AA4, 15AB1, 15AB2, 15AB3, and 15AB4 may be referred to as first gate line drive circuits 15AAo and 15ABo. The second gate line drive circuits 15BA1, 15BA2, 15BA3, 15BA4, 15BB1, 15BB2, 15BB3, and 15BB4 may be referred to as second gate line drive circuits 15BAo and 15BBo.

The first gate line drive circuits 15AAo and 15ABo are arranged with the detection blocks AAo interposed therebetween in the first direction Dx. The second gate line drive circuits 15BAo and 15BBo are arranged with the detection blocks AAo interposed therebetween in the first direction Dx. The signal line selection circuit 16 is provided between the detection blocks AAo and the detection circuit 11 and extends along sides of the detection blocks AAo that extend in the first direction Dx. The arrangements of the first gate line drive circuits 15AAo and 15ABo, the second gate line drive circuits 15BAo and 15BBo, and the signal line selection circuit 16 are not limited to these arrangements. Specifically, for example, in an aspect, the group of the first gate line drive circuits 15AAo and 15ABo and the group of the second gate line drive circuits 15BAo and 15BBo may be configured as one first gate line drive circuit and one second gate line drive circuit, respectively, and the first gate line drive circuit and the second gate line drive circuit may be arranged with the detection blocks AAo interposed therebetween in the first direction Dx.

Figure 3:
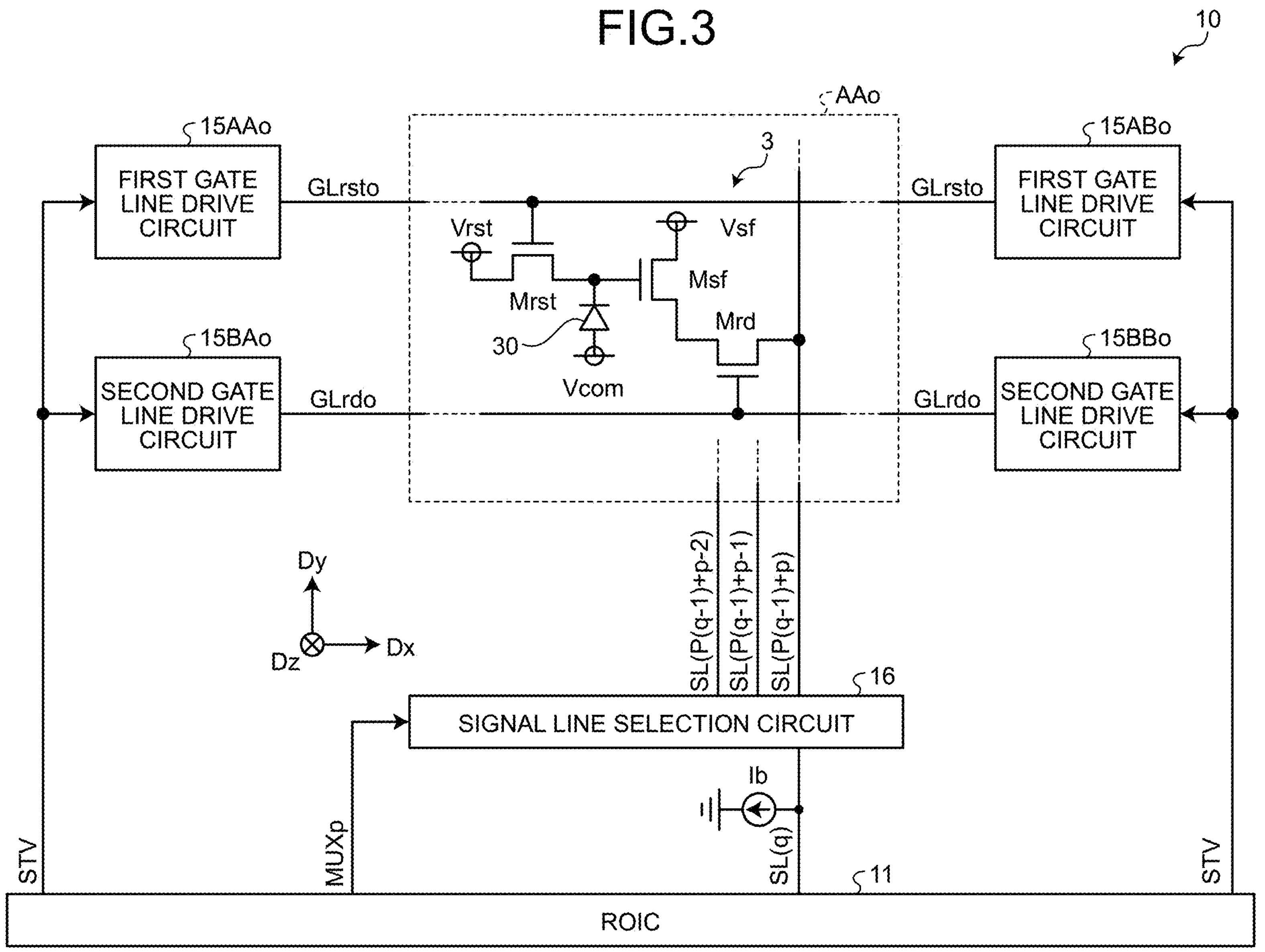
FIG. 3 is a circuit diagram illustrating an optical sensor according to the first embodiment.

FIG. 3 is a circuit diagram illustrating the optical sensor according to the first embodiment. As illustrated in FIG. 3, the sensor pixel 3 includes the photodiode 30, a reset transistor Mrst, a read transistor Mrd, and a source follower transistor Msf. The sensor pixel 3 is provided with a first gate line (reset control scan line GLrst), a second gate line (read control scan line GLrd), and signal lines SL.

The first gate line (reset control scan line GLrst), the second gate line (read control scan line GLrd), and the signal lines SL are each coupled to the sensor pixels 3 in the detection block AA. Specifically, the first gate line (reset control scan line GLrst) and the second gate line (read control scan line GLrd) extend in the first direction Dx and are coupled to the sensor pixels 3 arranged in the first direction Dx. The signal lines SL extend in the second direction Dy and are each coupled to the sensor pixels 3 arranged in the second direction Dy. The signal line SL is wiring through which signals from the transistors (read transistor Mrd and source follower transistor Msf) are output.

The reset transistor Mrst, the read transistor Mrd, and the source follower transistor Msf are provided correspondingly to one photodiode 30. The transistors included in the sensor pixel 3 are each formed of an n-type thin-film transistor (TFT). However, each of the transistors is not limited thereto and may be formed of a p-type TFT.

A reference potential Vcom is applied to the anode of the photodiode 30. The cathode of the photodiode 30 is coupled to one of the source and the drain of the reset transistor Mrst and the gate of the source follower transistor Msf.

The gate of the reset transistor Mrst is coupled to the first gate line (reset control scan line GLrst). The other of the source and the drain of the reset transistor Mrst is supplied with a reset potential Vrst. After the reset transistor Mrst is turned on (into a conducting state), the cathode potential of the photodiode 30 is reset to the reset potential Vrst. The reference potential Vcom is lower than the reset potential Vrst, and thus, the photodiode 30 is driven in a reverse-biased manner.

The source follower transistor Msf is coupled between a terminal supplied with a power supply potential Vsf and the read transistor Mrd. The gate of the source follower transistor Msf is coupled to the cathode of the photodiode 30. The gate of the source follower transistor Msf is supplied with a voltage corresponding to the received light intensity of the photodiode 30. As a result, the source follower transistor Msf outputs an electrical signal (potential) corresponding to the received light intensity of the photodiode 30 to the read transistor Mrd.

The read transistor Mrd is coupled between the source of the source follower transistor Msf and the signal line SL. The gate of the read transistor Mrd is coupled to the second gate line (read control scan line GLrd). After the read transistor Mrd is turned on, the signal output from the source follower transistor Msf, that is, the electrical signal (potential) corresponding to the received light intensity of the photodiode 30 is output as a detection signal Vdet to the signal line SL.

In FIG. 3, the reset transistor Mrst and the read transistor Mrd each have a single-gate structure. However, the reset transistor Mrst and the read transistor Mrd may each have what is called a double-gate structure formed of two transistors coupled in series or may have a configuration formed of three or more transistors coupled in series. The circuit of one sensor pixel 3 is not limited to the configuration including the three transistors of the reset transistor Mrst, the source follower transistor Msf, and the read transistor Mrd. The sensor pixel 3 may include two transistors or four or more transistors.

The first gate line drive circuits 15AAo and 15ABo are circuits that drive a plurality of the first gate lines (reset control scan lines GLrsto) in the detection blocks AAo. The first gate line drive circuits 15AAo and 15ABo are shift register circuits, for example.

In the present disclosure, the first gate line drive circuits 15AAo and 15ABo sequentially select the first gate lines (reset control scan lines GLrsto) during a reset period Prst (refer to FIG. 8) of the sensor pixels 3 based on various control signals including, for example, a start pulse signal STV (refer to FIG. 3) and a clock pulse signal supplied from the detection circuit 11, and supply first gate drive signals (reset control signals) to the selected first gate lines (reset control scan lines GLrsto). In other words, the first gate line drive circuits 15AAo and 15ABo simultaneously supply the first gate drive signals (reset control signals) to the sensor pixels 3 arranged in the first direction Dx, and sequentially supply the first gate drive signals (reset control signals) to the sensor pixels 3 arranged in the second direction Dy. This operation resets the potentials of the photodiodes 30 of the sensor pixels 3 coupled to the first gate lines (reset control scan lines GLrsto) selected by the first gate line drive circuits 15AAo and 15ABo of the sensor pixels 3.

The second gate line drive circuits 15BAo and 15BBo are circuits that drive a plurality of the second gate lines (read control scan lines GLrdo) in the detection blocks AAo. The second gate line drive circuits 15BAo and 15BBo are shift register circuits, for example.

In the present disclosure, the second gate line drive circuits 15BAo and 15BBo sequentially select the second gate lines (read control scan lines GLrdo) during a read period Pdet (refer to FIG. 8) of the detection signals Vdet based on the various control signals including, for example, the start pulse signal STV (refer to FIG. 3) and the clock pulse signal supplied from the detection circuit 11, and supply second gate drive signals (read control signals) to the selected second gate lines (read control scan lines GLrdo). In other words, the second gate line drive circuits 15BAo and 15BBo simultaneously supply the second gate drive signals (read control signals) to the sensor pixels 3 arranged in the first direction Dx, and sequentially supply the second gate drive signals (read control signals) to the sensor pixels 3 arranged in the second direction Dy. This operation reads the electrical signals (potentials) of the sensor pixels 3 coupled to the second gate lines (read control scan lines GLrdo) selected by the second gate line drive circuits 15BAo and 15BBo as the detection signals Vdet.

The signal line selection circuit 16 is a switch circuit that selects any one of P signal lines SL(P(q−1)+p) (where p is an integer from 1 to P) and couples the selected one to the detection circuit 11. The signal line selection circuit 16 is, for example, a multiplexer.

The signal line selection circuit 16 couples the signal lines SL(P(q−1)+p) selected based on a signal line selection signal MUXp supplied from the detection circuit 11 to the detection circuit 11, during the read period Pdet (refer to FIG. 8) of the detection signals Vdet. This operation simultaneously couples Q=M/P signal lines SL(q) (where M is the number of the sensor pixels 3 arranged in the first direction Dx in the detection block AAo, and q is an integer from 1 to Q) to the detection circuit 11 and outputs the detection signals Vdet from the sensor pixels 3 coupled to the Q signal lines SL(q) to the detection circuit 11. In other words, the signal line selection circuit 16 is a circuit that simultaneously selects Q (=M/P) pixel columns from a total number M of pixel columns in each of which the sensor pixels 3 are arranged in the second direction Dy, and outputs the detection signals Vdet from the sensor pixels 3 to the detection circuit 11.

Figure 4:
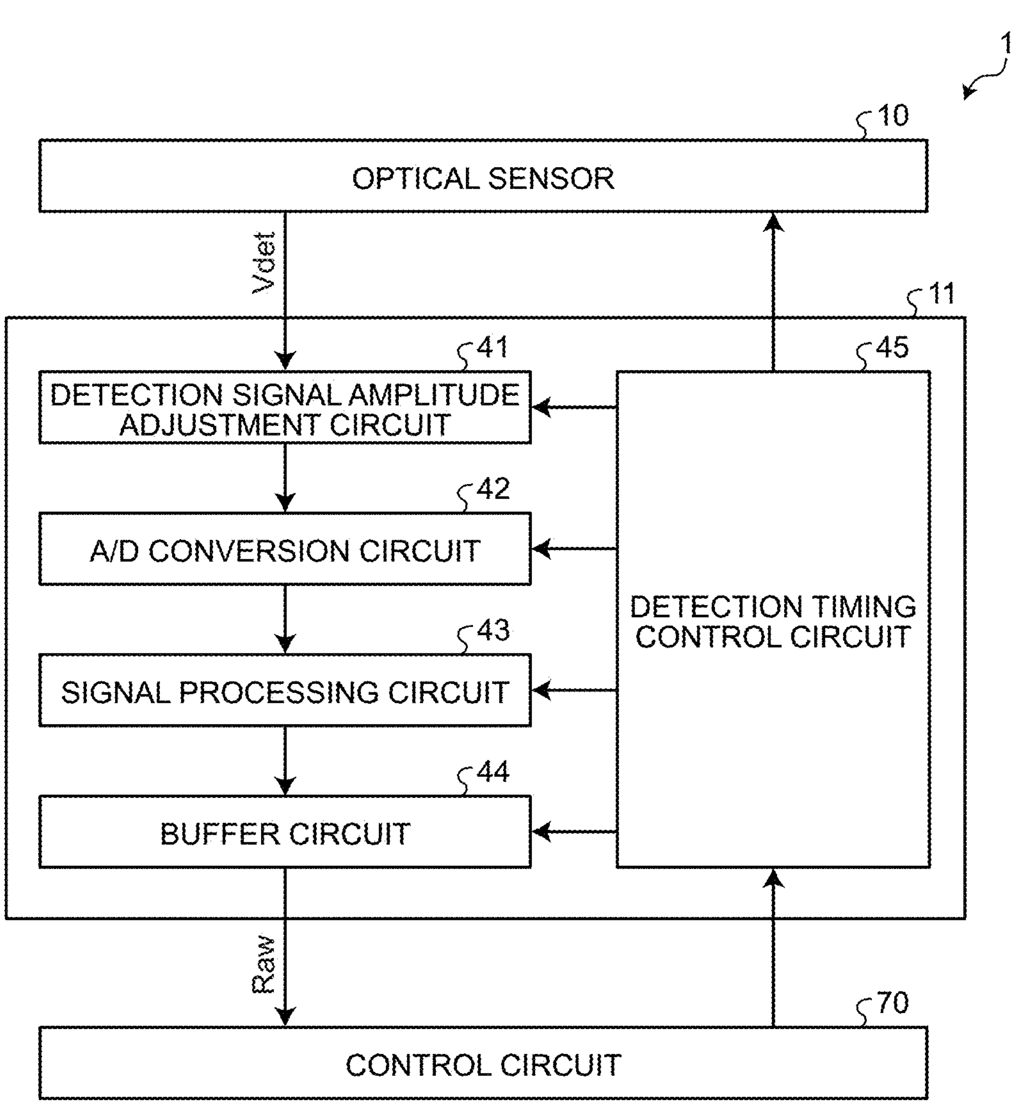
FIG. 4 is a block diagram illustrating a configuration example of a detection circuit according to the first embodiment.

FIG. 4 is a block diagram illustrating a configuration example of the detection circuit according to the first embodiment. The detection circuit 11 generates a sensor value Raw serving as a detection value of each of the sensor pixels 3 based on the detection signal Vdet output from the optical sensor 10. The detection circuit 11 is, for example, a readout integrated circuit (ROIC) that includes an analog front-end (AFE) circuit.

As illustrated in FIG. 4, the detection circuit 11 includes a detection signal amplitude adjustment circuit 41, an analog-to-digital (A/D) conversion circuit 42, a signal processing circuit 43, a buffer circuit 44, and a detection timing control circuit 45.

The detection signal amplitude adjustment circuit 41 is a circuit that adjusts the amplitude of the detection signal Vdet output from the optical sensor 10 and is configured with an amplifier, for example. The A/D conversion circuit 42 converts an analog signal output from the detection signal amplitude adjustment circuit 41 into a digital signal. The signal processing circuit 43 performs signal processing on the digital signal from the A/D conversion circuit 42 and stores the sensor value Raw of each of the sensor pixels 3 in the buffer circuit 44.

Based on various control signals supplied from the control circuit 70 (refer to FIG. 5), the detection timing control circuit 45 performs control to cause the detection signal amplitude adjustment circuit 41, the A/D conversion circuit 42, the signal processing circuit 43, and the buffer circuit 44 to operate in synchronization with one another. The sensor value Raw of each of the sensor pixels 3 stored in the buffer circuit 44 is transmitted to the control circuit 70 based on a read control signal from the control circuit 70.

The detection timing control circuit 45 is a circuit that supplies respective control signals to the first gate line drive circuits 15AAo and 15ABo, the second gate line drive circuits 15BAo and 15BBo, and the signal line selection circuit 16 and controls operations of these circuits to perform detection operations in the detection block AAo. The detection timing control circuit 45 supplies the various control signals including, for example, the start pulse signals STV (refer to FIG. 3) and the clock pulse signals to the first gate line drive circuits 15AAo and 15ABo and the second gate line drive circuits 15BAo and 15BBo. The detection timing control circuit 45 supplies also the signal line selection signal MUXp (refer to FIG. 3) to the signal line selection circuit 16.

Figure 5:
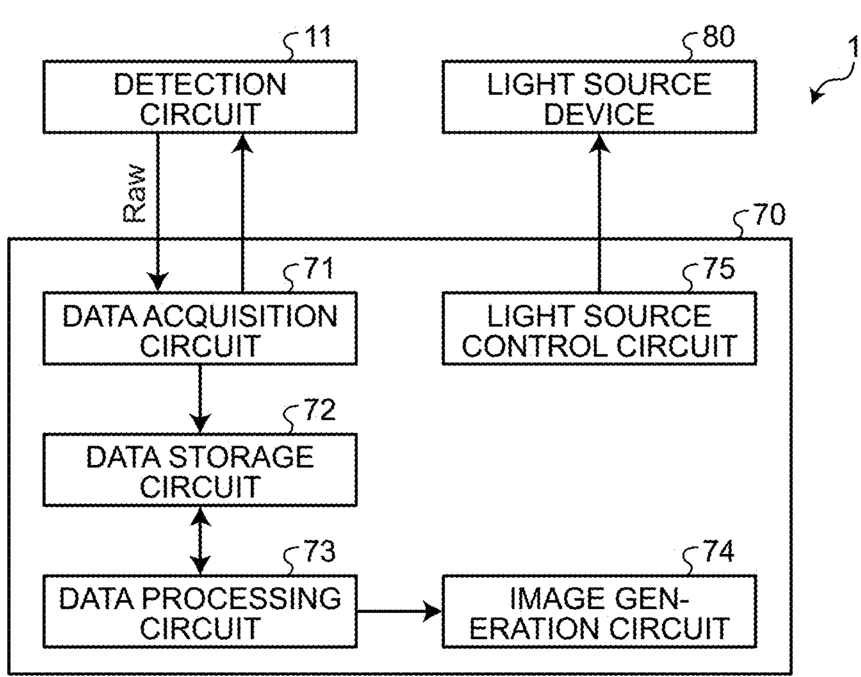
FIG. 5 is a block diagram illustrating a configuration example of a control circuit according to the first embodiment.

FIG. 5 is a block diagram illustrating a configuration example of the control circuit according to the first embodiment. The control circuit 70 synchronously controls detection operations of the objects to be detected 100 in the detection circuit 11 and lighting operations of the light-emitting elements 82 in the light source device 80. The control circuit 70 includes, for example, a micro-controller unit (MCU), a random-access memory (RAM), an electrically erasable programmable read-only memory (EEPROM), and a read-only memory (ROM).

Signal transmission between the control circuit 70 and the detection circuit 11 and between the control circuit 70 and the light source device 80 is performed, for example, by a serial peripheral interface (SPI) that is a clock synchronization-type serial interface. The present disclosure is not limited by the signal transmission method between the control circuit 70 and the optical sensor 10 and between the control circuit 70 and the light source device 80.

As illustrated in FIG. 5, the control circuit 70 includes a data acquisition circuit 71, a data storage circuit 72, a data processing circuit 73, an image generation circuit 74, and a light source control circuit 75.

The data acquisition circuit 71 transmits the read control signal to the detection circuit 11, acquires the sensor value Raw for each of the sensor pixels 3, and stores it in the data storage circuit 72 in association with positional information on the sensor pixel 3 in the detection block AAo. The data processing circuit 73 performs a process of combining the sensor values Raw of the respective sensor pixels 3 stored in the data storage circuit 72. The image generation circuit 74 generates an image of the detection block AA based on the combined sensor values Raw in the entire area of the detection blocks AAo and the positional information on the sensor pixels 3 in the detection blocks AAo.

The light source control circuit 75 controls the lighting operations of the light-emitting elements 82 in synchronization with the detection operations in the detection circuit 11. Specifically, when the light source device 80 is configured with a plurality of the light-emitting elements 82, the light source control circuit 75 stores information on the lighting patterns of on (lit) and off (unlit) of the light-emitting elements 85 and transmits light emission control signals according to the information on the lighting patterns to the light source device 80.

As described above, in the present disclosure, the optical sensor 10 includes a plurality of the detection blocks AAo. The first gate line drive circuits 15AAo and 15ABo and the second gate line drive circuits 15BAo and 15BBo are provided correspondingly to the detection blocks AAo. FIG. 6 is a diagram illustrating an exemplary coupling configuration between the optical sensor and the detection circuit according to the first embodiment.

FIG. 6 illustrates a configuration where the four detection blocks AA1, AA2, AA3, and AA4 each having the same number of the sensor pixels 3 arranged in the first direction Dx and the second direction Dy are arranged in the second direction Dy. In the four detection blocks AA1, AA2, AA3, and AA4, the number M of the sensor pixels 3 arranged in the first direction Dx is set to, for example, 1000 (M=1000). In the four detection blocks AA1, AA2, AA3, and AA4, the number of the sensor pixels 3 arranged in the second direction Dy is set to, for example, 250 (N=250). A number O (=4) of the detection blocks AAo included in the optical sensor 10 is an example and not limited to this number.

As illustrated in FIG. 6, in the present disclosure, the signal line selection circuit 16 selects any one of the P (4 in FIG. 6) signal lines SL(P(q−1)+p) and couples Q (=M (=1000)/P(=4)=250) signal lines out of the M (=1000) signal lines SL(m) (m is an integer from 1 to M) to the detection circuit 11. This operation simultaneously connects Q=M/P (here, Q=1000/4=250 lines) signal lines SL(q) to the detection circuit 11 (q is an integer from 1 to Q).

Figure 7:
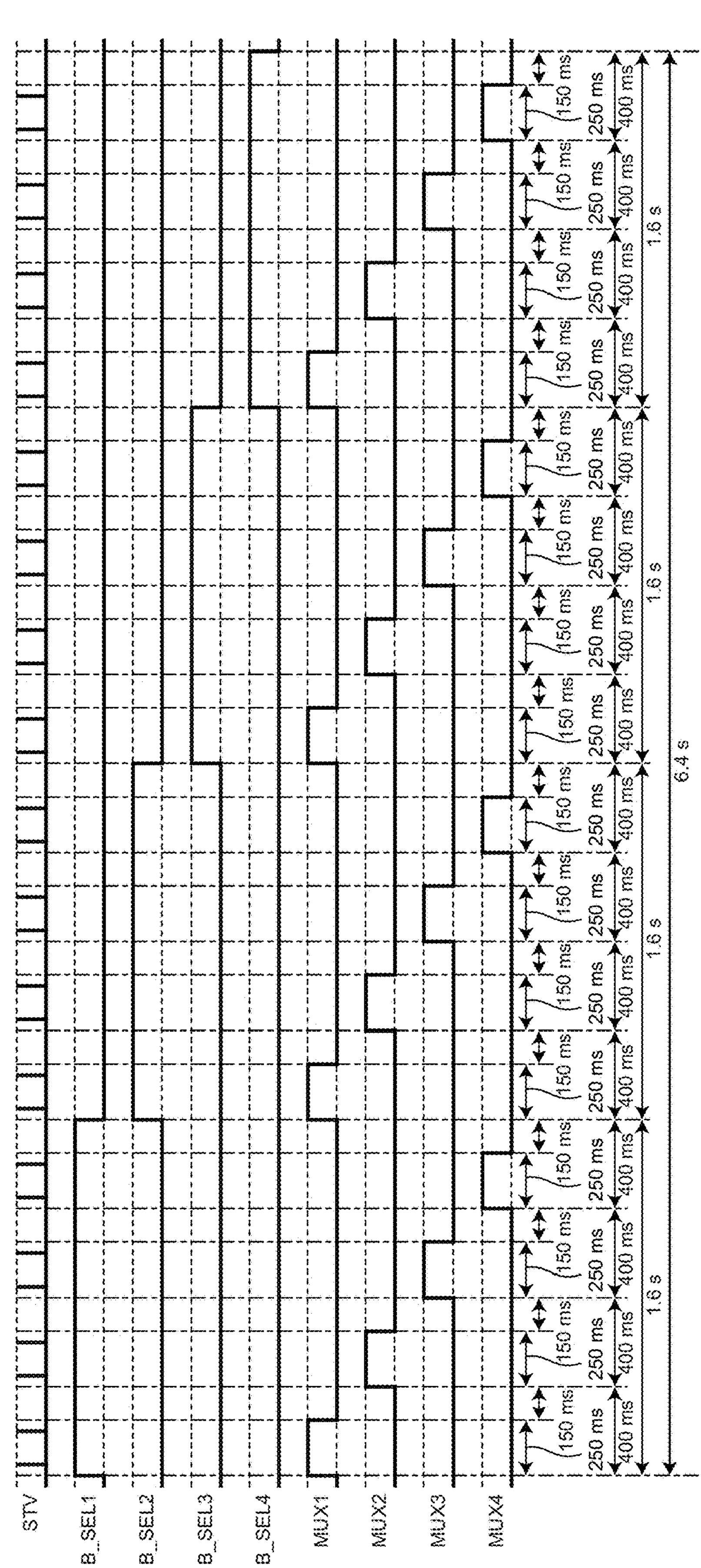
FIG. 7 is a timing diagram illustrating an example of sensor value acquisition timing for one frame in the detection device according to the first embodiment.

FIG. 7 is a timing diagram illustrating an example of sensor value acquisition timing for one frame in the detection device according to the first embodiment.

In the coupling configuration illustrated in FIG. 6, the detection circuit 11 supplies the common start pulse signal STV to the first gate line drive circuits 15AA1, 15AA2, 15AA3, 15AA4, 15AB1, 15AB2, 15AB3, and 15AB4 and the second gate line drive circuits 15BA1, 15BA2, 15BA3, 15BA4, 15BB1, 15BB2, 15BB3, and 15BB4, and supplies selection signals B_SEL1, B_SEL2, B_SEL3, and B_SEL4 corresponding to the detection blocks AA1, AA2, AA3, and AA4, respectively, for each of the first gate line drive circuits 15AA1, 15AA2, 15AA3, 15AA4, 15AB1, 15AB2, 15AB3, and 15AB4 and the second gate line drive circuits 15BA1, 15BA2, 15BA3, 15BA4, 15BB1, 15BB2, 15BB3, and 15BB4.

Specifically, the detection circuit 11 sequentially supplies the selection signals B_SEL1, B_SEL2, B_SEL3, and B_SEL4 by time-dividing a sensor value acquisition period for one frame illustrated in FIG. 7. FIG. 7 illustrates an example in which, in each of the periods in each of which the corresponding selection signal B_SELo is high and the first gate line drive circuits 15AAo and 15ABo and the second gate line drive circuits 15BAo and 15BBo corresponding to the selection signal B_SELo are enabled. Hereinafter, the period in which the selection signal B_SELo is high is also referred to as a selection period of the detection block AAo (block selection period). In other words, in each of the selection periods of the detection blocks AAo (block selection period), the detection circuit 11 of the first embodiment supplies the selection signal B_SELo to enable the first gate line drive circuits 15AAo and 15ABo and the second gate line drive circuits 15BAo and 15BBo.

In the coupling configuration illustrated in FIG. 6, the detection circuit 11 sequentially supplies signal line selection signals MUX1, MUX2, MUX3, and MUX4 by time-dividing the selection period of the detection block AAo (that is, the period in which the selection signal B_SELo is high). FIG. 7 illustrates an example in which, in each of the periods in which the respective signal line selection signals MUXp are high, a corresponding one of the signal lines SL(P(q−1)+p) is coupled to the detection circuit 11. Hereinafter, the period in which the signal line selection signal MUXp is high is also referred to as a selection period of the signal line SL(P(q−1)+p) (signal selection period).

Figure 8:
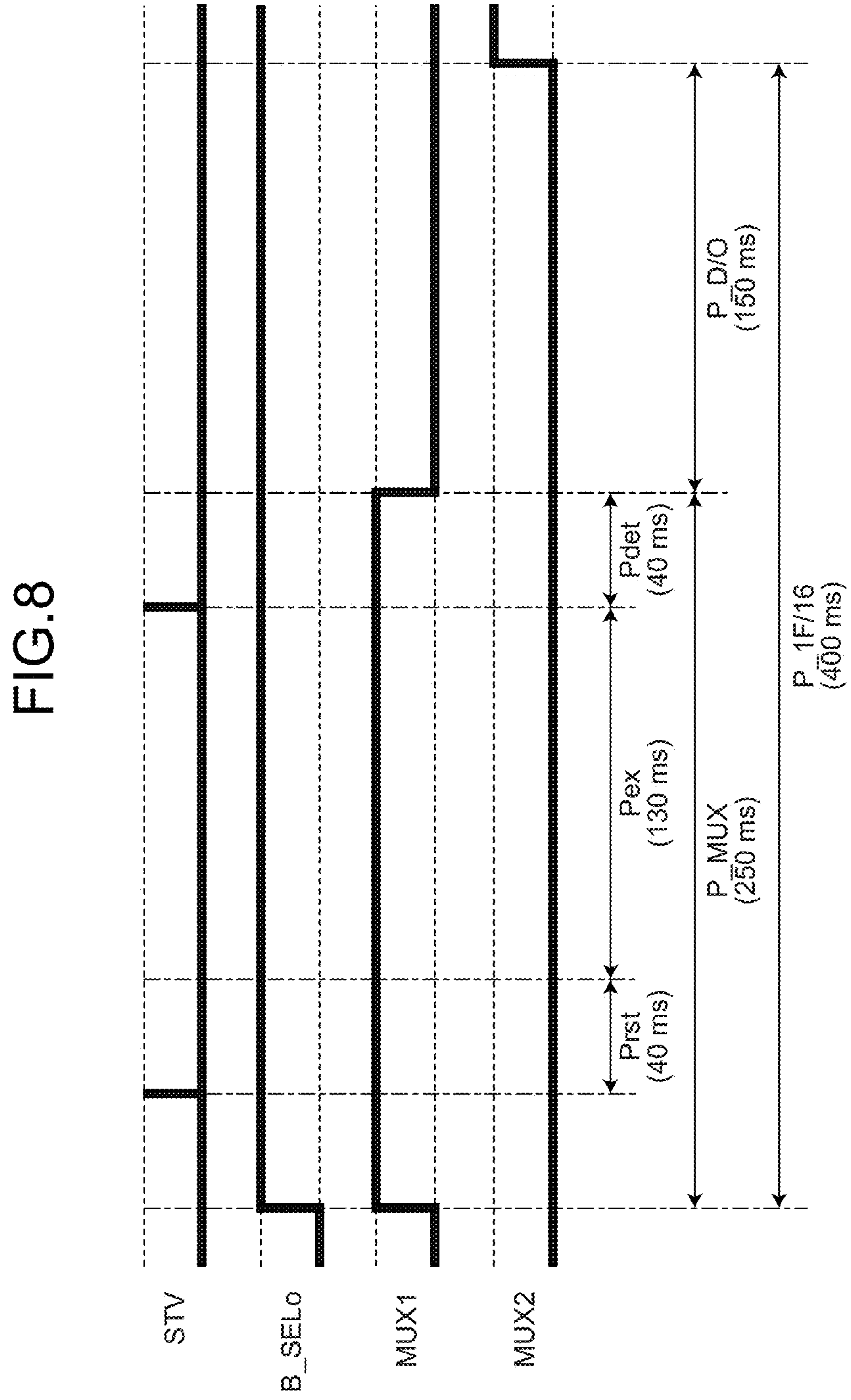
FIG. 8 is a timing diagram illustrating an operation example of the optical sensor in a 1/(O×P) frame period.
Figure 9A:
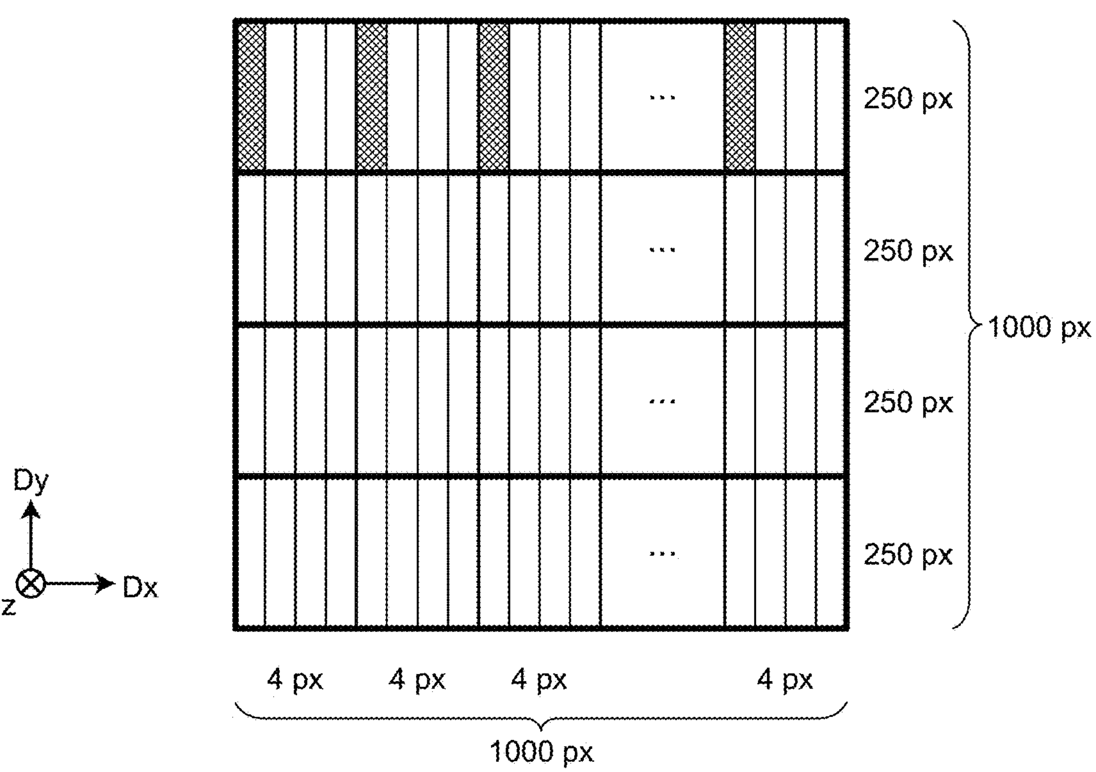
FIG. 9A is an illustrative diagram illustrating exemplary areas where sensor values are acquired in a 1/16 frame period.
Figure 9B:
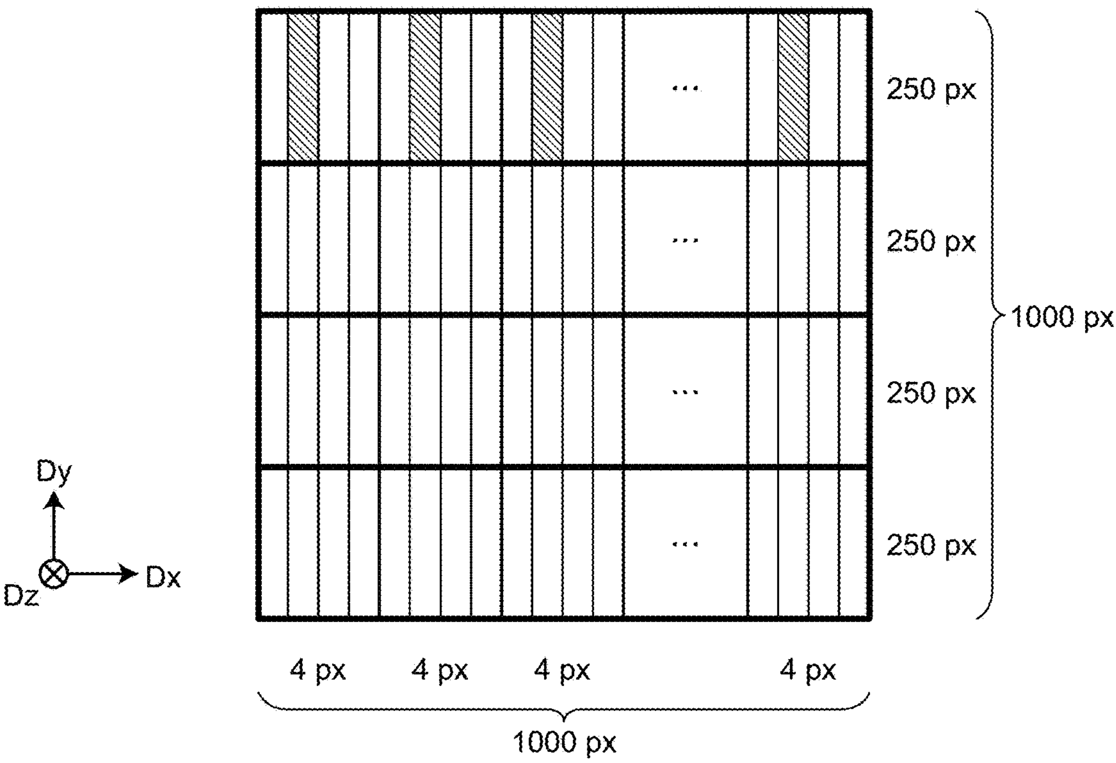
FIG. 9B is an illustrative diagram illustrating exemplary areas where the sensor values are acquired in the 1/16 frame period.
Figure 9C:
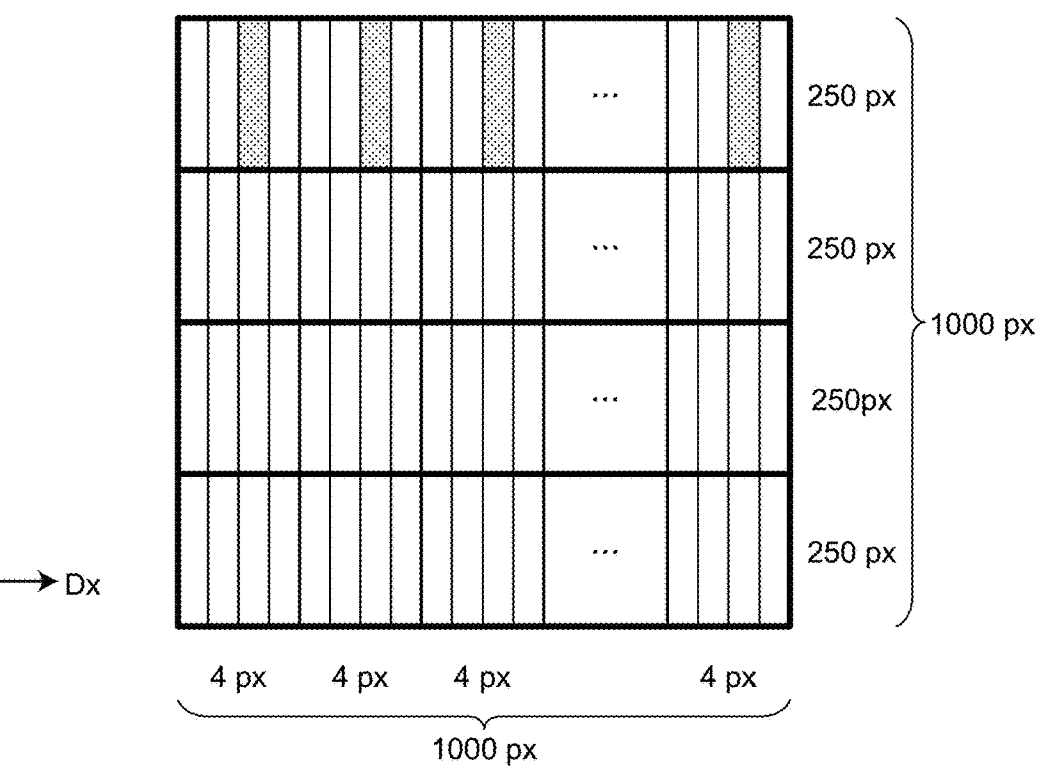
FIG. 9C is an illustrative diagram illustrating exemplary areas where the sensor values are acquired in the 1/16 frame period.
Figure 9D:
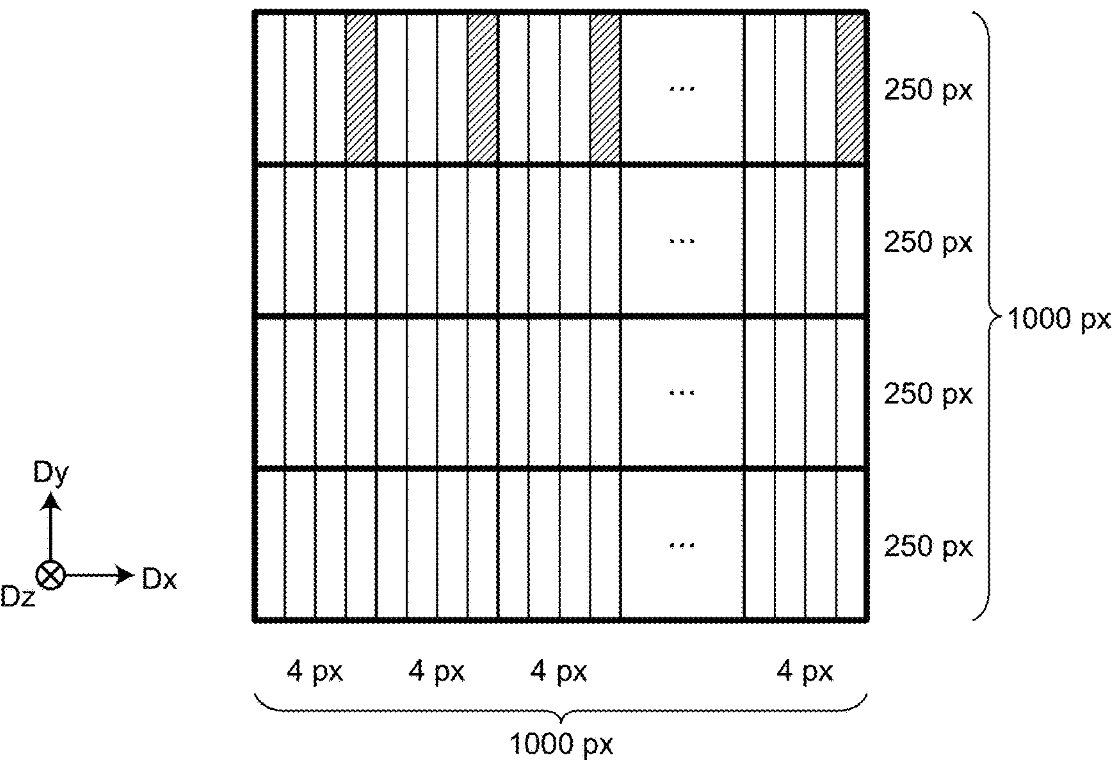
FIG. 9D is an illustrative diagram illustrating exemplary areas where the sensor values are acquired in the 1/16 frame period.

FIG. 8 is a timing diagram illustrating an operation example of the optical sensor in a 1/(O×P) frame period. FIGS. 9A to 9P are illustrative diagrams illustrating areas where the sensor values are acquired in the 1/(O×P) frame period.

FIG. 9A illustrates areas where the sensor values Raw are acquired during the selection period of the detection block AA1 and the signal line SL(P(q−1)+1). FIG. 9B illustrates areas where the sensor values Raw are acquired during the selection period of the detection block AA1 and the signal line SL(P(q−1)+2). FIG. 9C illustrates areas where the sensor values Raw are acquired during the selection period of the detection block AA1 and the signal line SL(P(q−1)+3). FIG. 9D illustrates areas where the sensor values Raw are acquired during the selection period of the detection block AA1 and the signal line SL(P(q−1)++4).

Figure 9E:
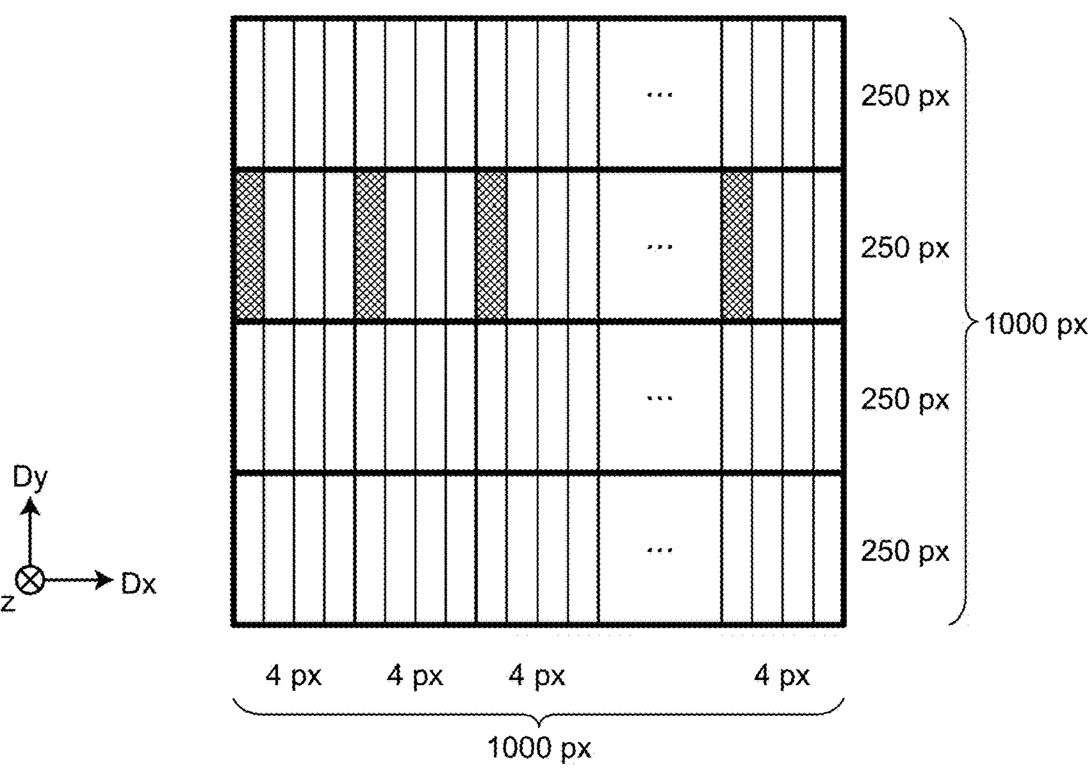
FIG. 9E is an illustrative diagram illustrating exemplary areas where the sensor values are acquired in the 1/16 frame period.
Figure 9F:
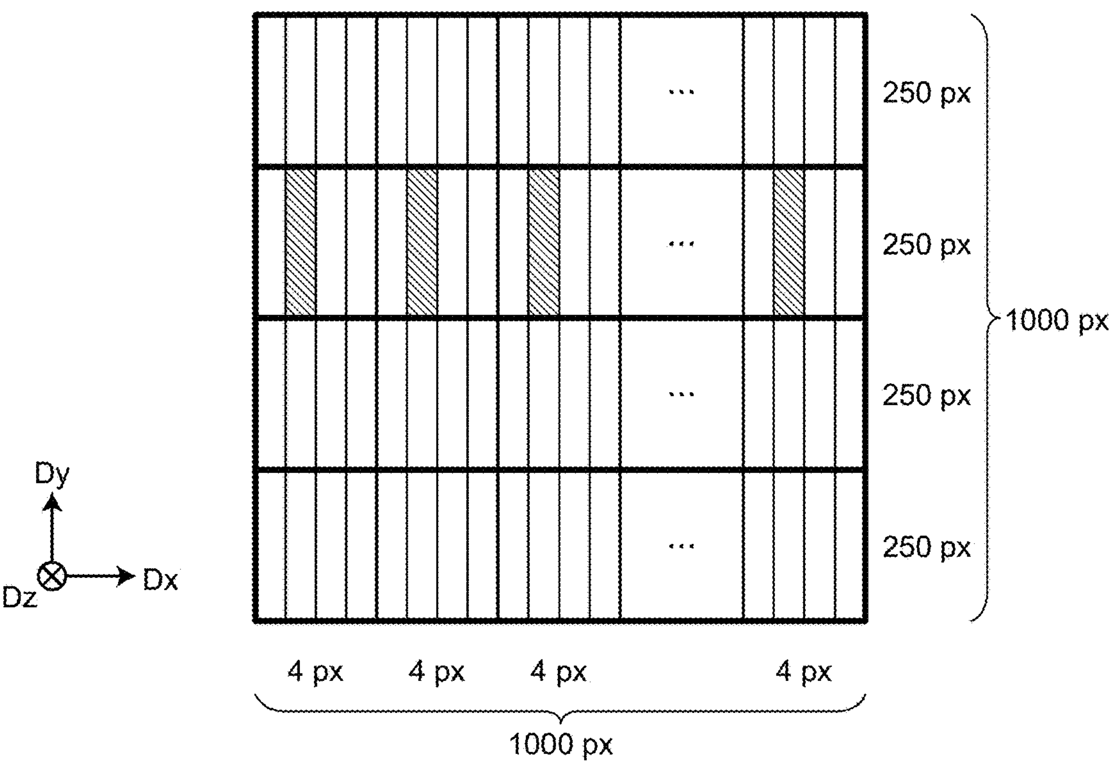
FIG. 9F is an illustrative diagram illustrating exemplary areas where the sensor values are acquired in the 1/16 frame period.
Figure 9G:
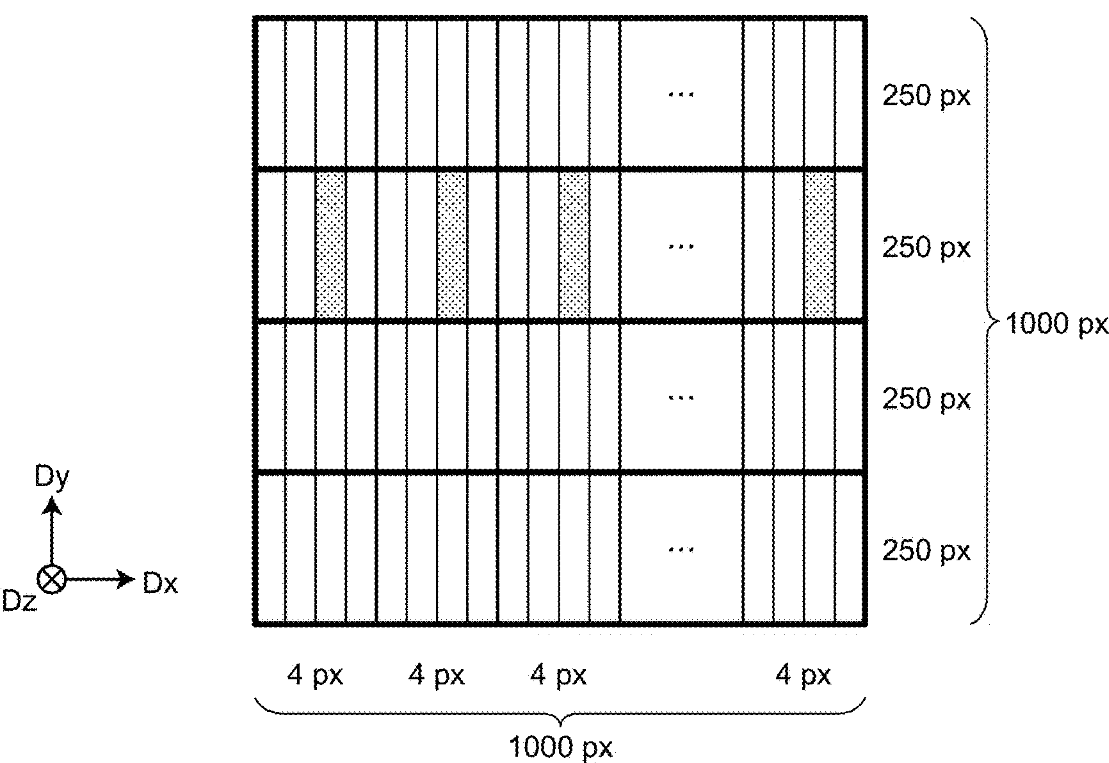
FIG. 9G is an illustrative diagram illustrating exemplary areas where the sensor values are acquired in the 1/16 frame period.
Figure 9H:
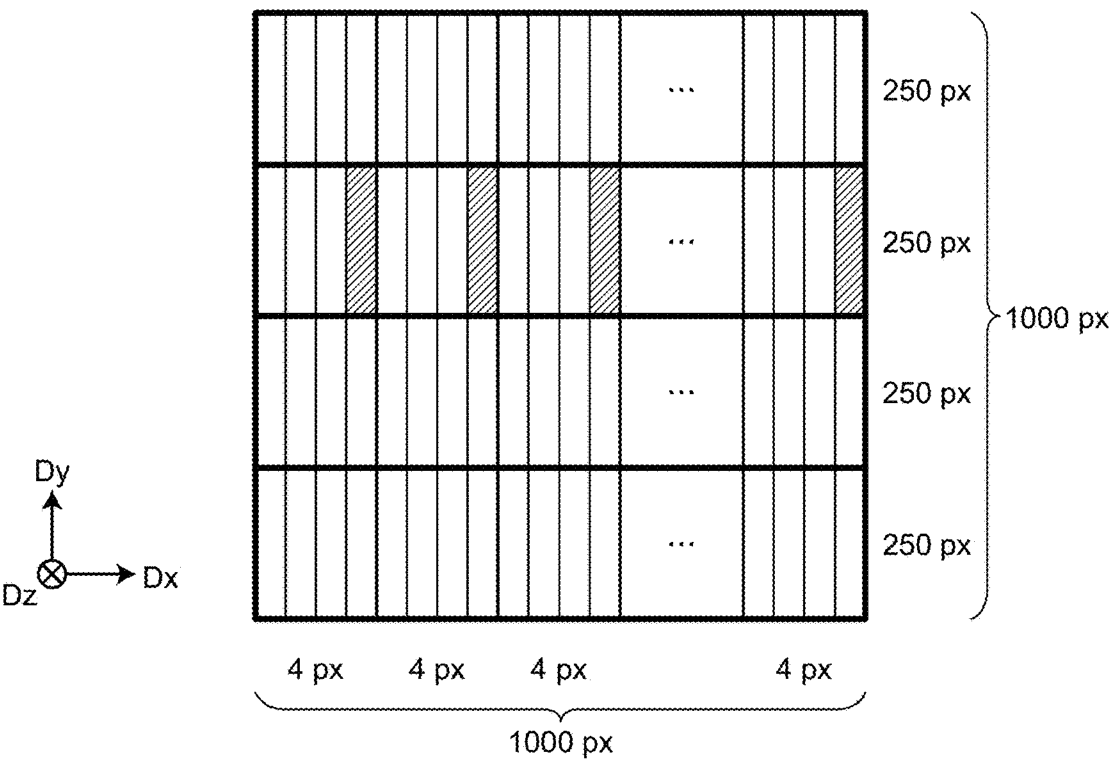
FIG. 9H is an illustrative diagram illustrating exemplary areas where the sensor values are acquired in the 1/16 frame period.

FIG. 9E illustrates areas where the sensor values Raw are acquired during the selection period of the detection block AA2 and the signal line SL(P(q−1)+1). FIG. 9F illustrates areas where the sensor values Raw are acquired during the selection period of the detection block AA2 and the signal line SL(P(q−1)+2). FIG. 9G illustrates areas where the sensor values Raw are acquired during the selection period of the detection block AA2 and the signal line SL(P(q−1)+3). FIG. 9H illustrates areas where the sensor values Raw are acquired during the selection period of the detection block AA2 and the signal line SL(P(q−1)+4).

Figure 9I:
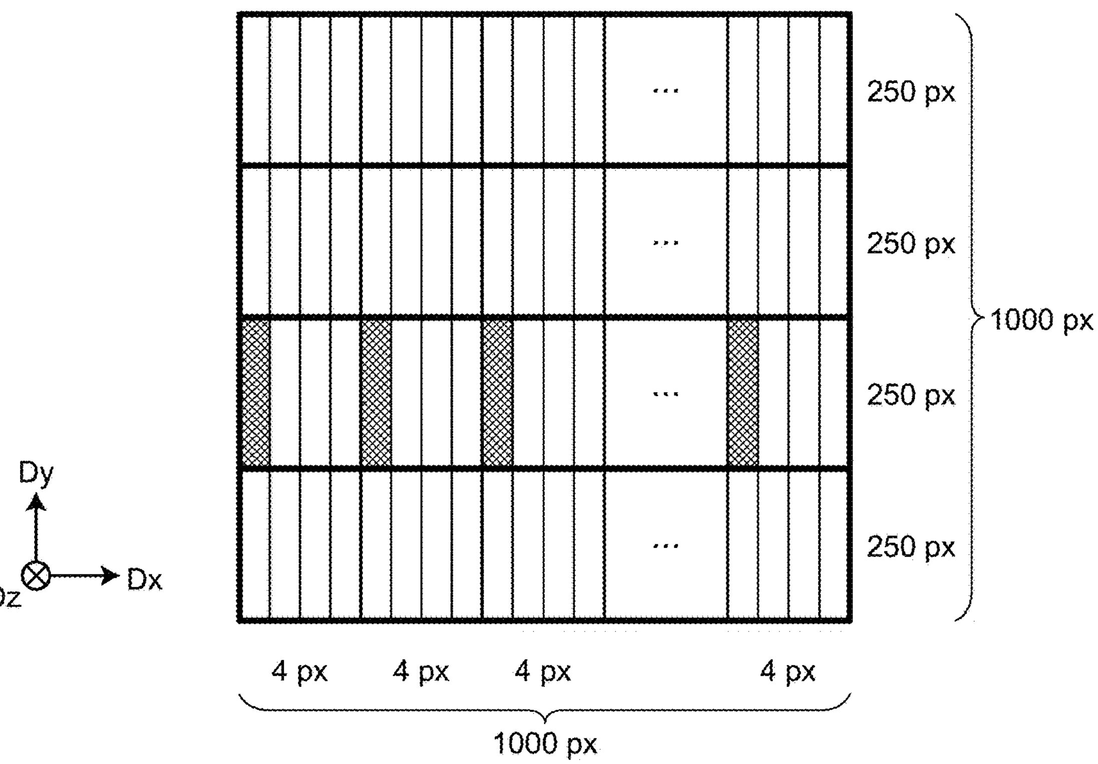
FIG. 9I is an illustrative diagram illustrating exemplary areas where the sensor values are acquired in the 1/16 frame period.
Figure 9J:
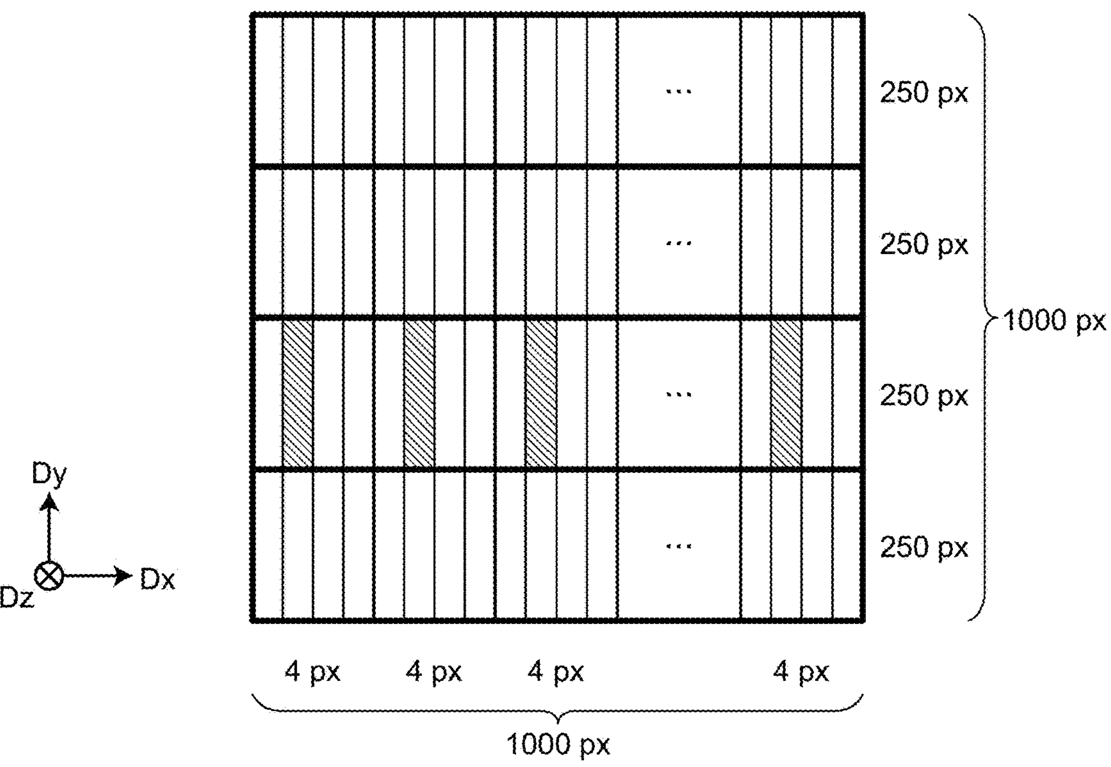
FIG. 9J is an illustrative diagram illustrating exemplary areas where the sensor values are acquired in the 1/16 frame period.
Figure 9K:
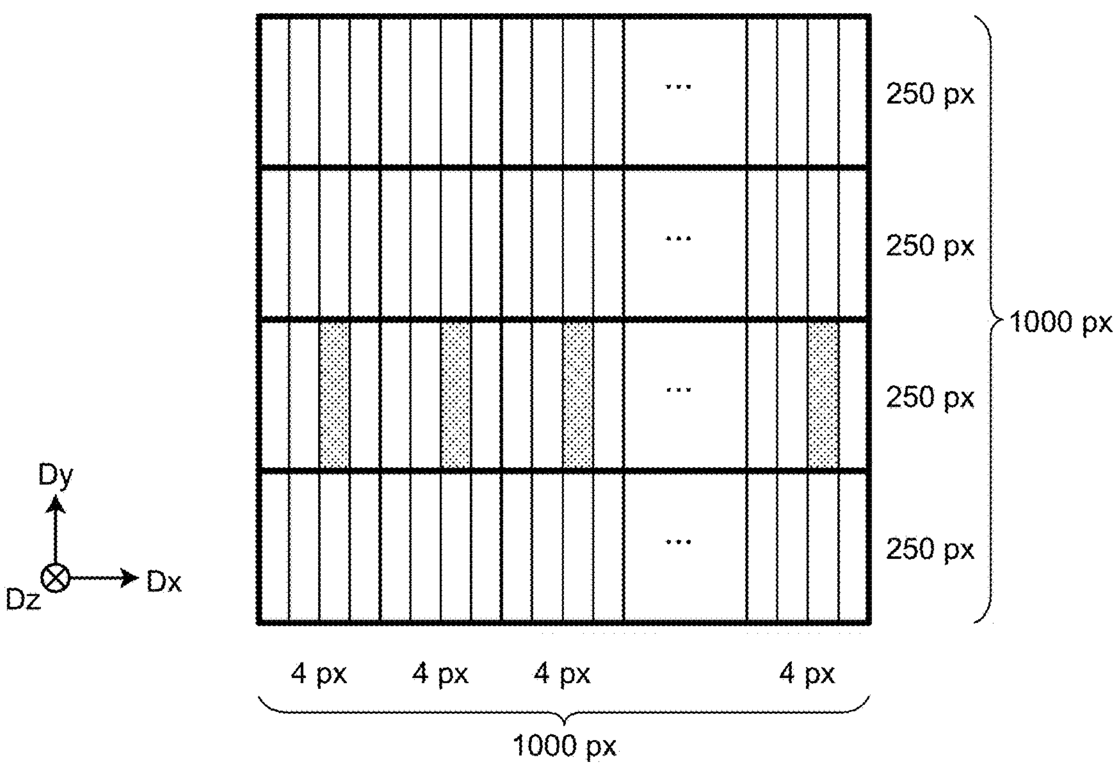
FIG. 9K is an illustrative diagram illustrating exemplary areas where the sensor values are acquired in the 1/16 frame period.
Figure 9L:
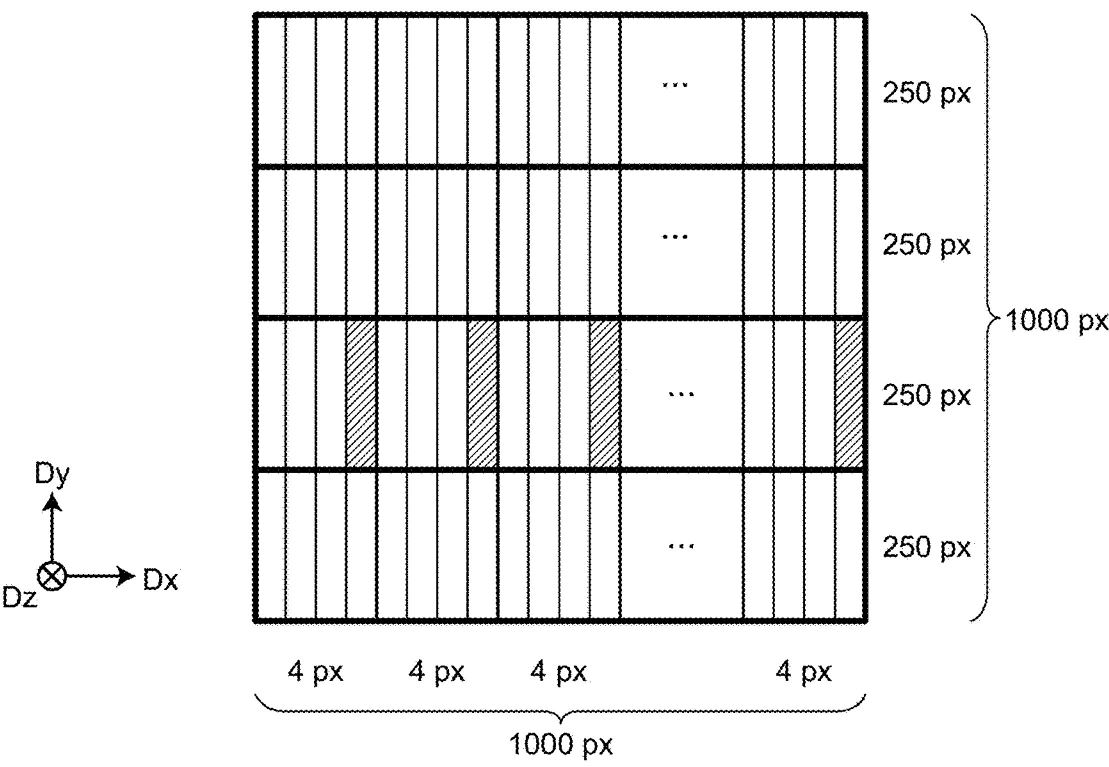
FIG. 9L is an illustrative diagram illustrating exemplary areas where the sensor values are acquired in the 1/16 frame period.

FIG. 9I illustrates areas where the sensor values Raw are acquired during the selection period of the detection block AA3 and the signal line SL(P(q−1)+1). FIG. 9J illustrates areas where the sensor values Raw are acquired during the selection period of the detection block AA3 and the signal line SL(P(q−1)+2). FIG. 9K illustrates areas where the sensor values Raw are acquired during the selection period of the detection block AA3 and the signal line SL(P(q−1)+3). FIG. 9L illustrates areas where the sensor values Raw are acquired during the selection period of the detection block AA3 and the signal line SL(P(q−1)+4).

Figure 9M:
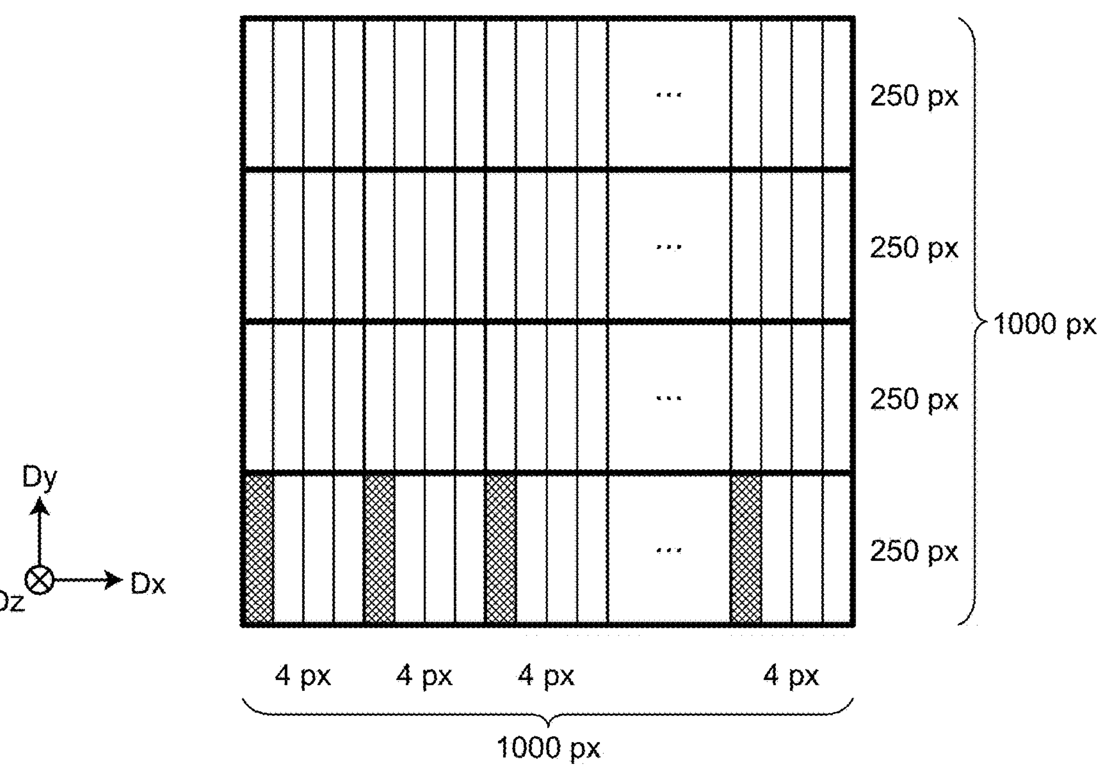
FIG. 9M is an illustrative diagram illustrating exemplary areas where the sensor values are acquired in the 1/16 frame period.
Figure 9N:
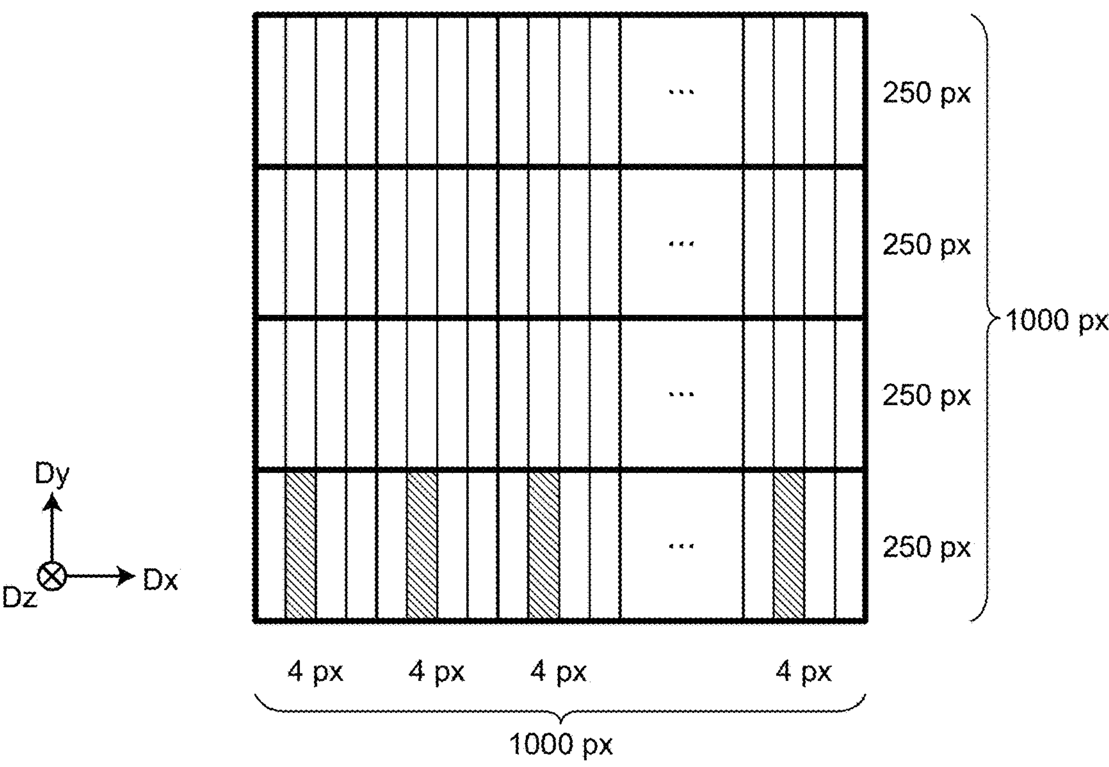
FIG. 9N is an illustrative diagram illustrating exemplary areas where the sensor values are acquired in the 1/16 frame period.
Figure 9O:
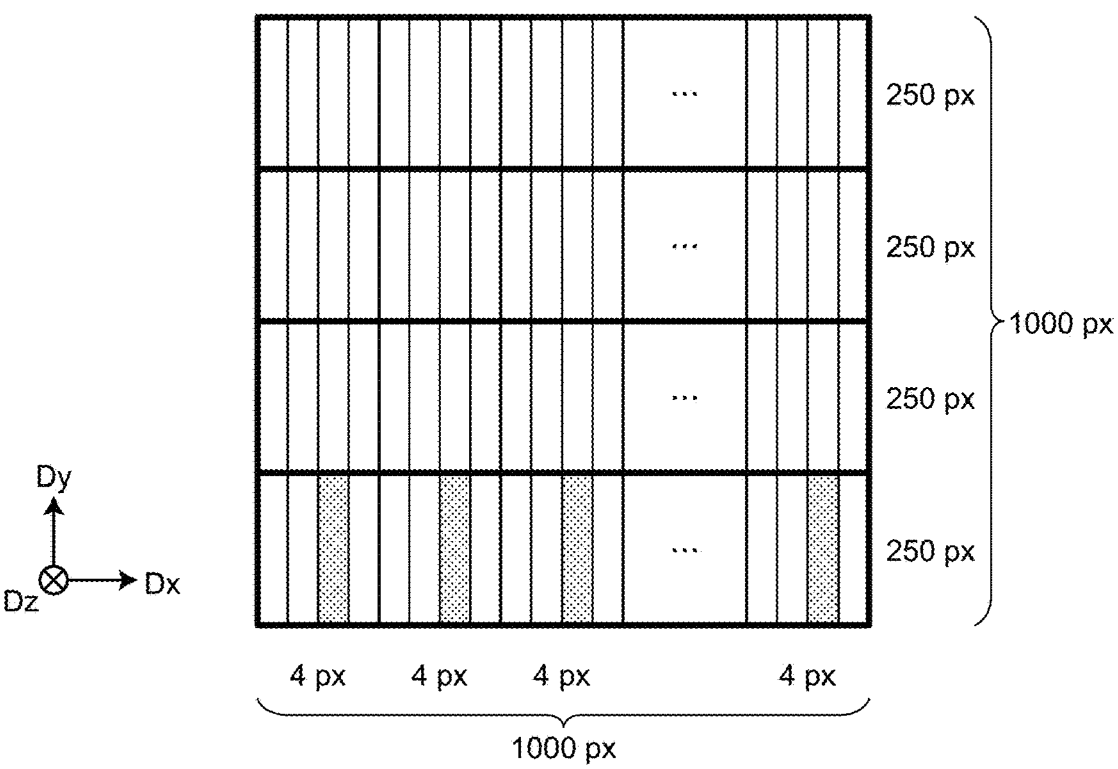
FIG. 9O is an illustrative diagram illustrating exemplary areas where the sensor values are acquired in the 1/16 frame period.
Figure 9P:
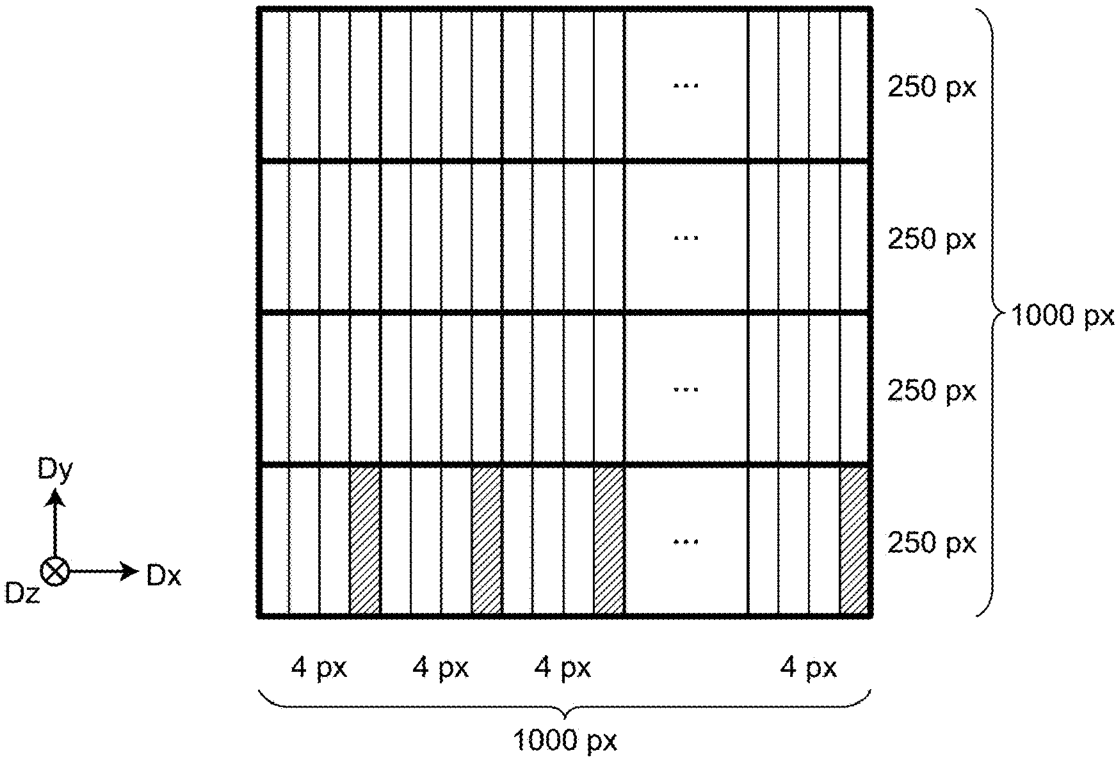
FIG. 9P is an illustrative diagram illustrating exemplary areas where the sensor values are acquired in the 1/16 frame period.

FIG. 9M illustrates areas where the sensor values Raw are acquired during the selection period of the detection block AA4 and the signal line SL(P(q−1)+1). FIG. 9N illustrates areas where the sensor values Raw are acquired during the selection period of the detection block AA4 and the signal line SL(P(q−1)+2). FIG. 9O illustrates areas where the sensor values Raw are acquired during the selection period of the detection block AA4 and the signal line SL(P(q−1)+3). FIG. 9P illustrates areas where the sensor values Raw are acquired during the selection period of the detection block AA4 and the signal line SL(P(q−1)+4).

After the start pulse signal STV is supplied to the first gate line drive circuits 15AAo and 15ABo and the second gate line drive circuits 15BAo and 15BBo in the selection period of the detection block AAo and the signal line SL(P(q−1)+p), the reset period Prst of the sensor pixels 3 coupled to the signal line SL(P(q−1)+p) in the detection block AAo starts. During the reset period Prst, the first gate line drive circuits 15AAo and 15ABo and the second gate line drive circuits 15BAo and 15BBo sequentially select the first gate lines (reset control scan lines GLrst) and the second gate lines (read control scan lines GLrd). This operation resets the potentials of the photodiodes 30 of the sensor pixels 3 coupled to the signal line SL(P(q−1)+p) in the detection block AAo. When a number N of the sensor pixels 3 arranged in the second direction Dy in the detection block AAo is 250, in other words, when the numbers N of the first gate lines (reset control scan lines GLrst) and the second gate lines (read control scan lines GLrd) in the detection block AAo are each 250, the reset period Prst is set to approximately 40 ms, for example.

After the start pulse signal STV is supplied to the first gate line drive circuits 15AAo and 15ABo and the second gate line drive circuits 15BAo and 15BBo after an exposure period Pex has elapsed after the reset period Prst, the read period Pdet starts to read the sensor pixels 3 coupled to the signal line SL(P(q−1)+p) in the detection block AAo. During the read period Pdet, the first gate line drive circuits 15AAo and 15ABo and the second gate line drive circuits 15BAo and 15BBo sequentially select the first gate lines (reset control scan lines GLrst) and the second gate lines (read control scan lines GLrd). This operation reads the detection signals Vdet of the sensor pixels 3 coupled to the signal line SL(P(q−1)+p) in the detection block AAo. The exposure period Pex is approximately 130 ms, for example. The read period Pdet is approximately 40 ms, for example.

A selection period P_MUX of the signal line SL(P(q−1)+p) that includes the reset period Prst, the exposure period Pex, and the read period Pdet described above is 250 ms, for example. The detection signal Vdet read in the read period Pdet is converted into the sensor value Raw for each of the sensor pixels 3 and stored in the buffer circuit 44 of the detection circuit 11.

In a data acquisition period P_D/O after the selection period P_MUX of the signal line SL(P(q−1)+p), the data acquisition circuit 71 of the control circuit 70 acquires the sensor value Raw for each of the sensor pixels 3 stored in the buffer circuit 44 of the detection circuit 11, and stores the sensor value Raw in the data storage circuit 72 in association with the positional information on the sensor pixel 3 in the detection block AA. The data acquisition period P_D/O is approximately 150 ms. As a result, a 1/16 frame period P_1F/16 illustrated in FIG. 8 is approximately 400 ms.

The detection circuit 11 then switches the signal line that is selected by the signal line selection circuit 16 and performs the same detection operation. Thus, the sensor values Raw of the sensor pixels 3 in the detection block AAo selected by the selection signals B_SELo are acquired. The period for acquiring the sensor values Raw of the sensor pixels 3 in one detection block AAo is approximately 1.6 s.

By repeating this sequence of operations O times in one frame period (O is the total number of the detection blocks AAo, and herein, O=4), the sensor values Raw of the sensor pixels 3 in all the detection blocks AAo are acquired. The one frame period for acquiring the sensor values Raw of the sensor pixels 3 in all the detection blocks AAo is approximately 6.4 s.

Figure 10:
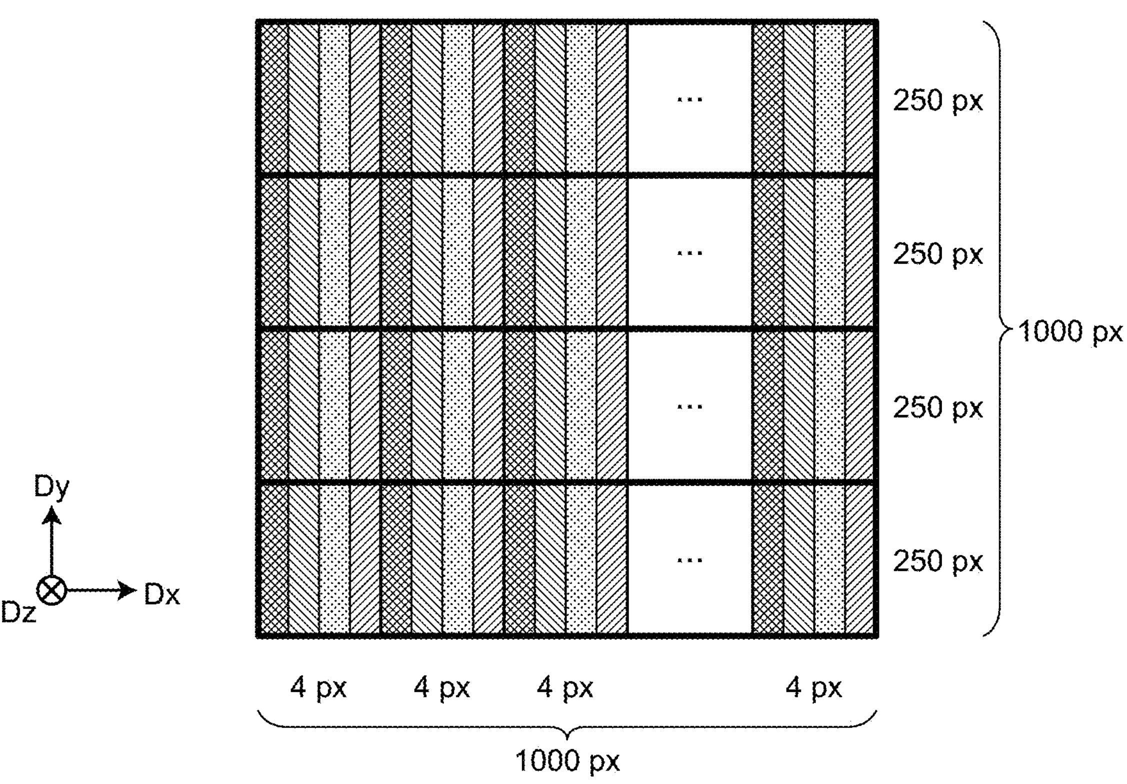
FIG. 10 is an illustrative diagram illustrating the sensor values in all detection blocks in a combined state.

After the sensor values Raw of the sensor pixels 3 in all the detection blocks AAo are acquired, the data processing circuit 73 reads the sensor values Raw of the respective sensor pixels 3 stored in the data storage circuit 72 and performs the process of combining the read sensor values Raw. FIG. 10 is an illustrative diagram illustrating the sensor values in all the detection blocks in a combined state.

The image generation circuit 74 generates the image for one frame in the detection area AA based on the combined sensor values Raw and the positional information on the sensor pixels 3 in all the detection blocks AAo.

The configuration and the operations according to the first embodiment described above enable employment of a low-cost ROIC in which, for example, the number of the simultaneously coupleable signal lines (for example, approximately 256) is smaller than the number M (=1000) of the sensor pixels arranged in the first direction Dx, and the buffer size (number of buffers) (for example, approximately 256×256) is smaller than the total number M×N (=1000×250) of the sensor values Raw acquired in each of the selection periods of the detection blocks AAo (block selection period). Specifically, the number of input terminals of the ROIC coupleable to the signal lines only needs to be larger than the number of the simultaneously selected signal lines Q=M/P lines (=1000/4=250 lines). The buffer size (number of buffers) of the ROIC only needs to be larger than the total number of the sensor values Raw Q×N (=250×250) acquired in each selection period (signal selection period) of the signal line SL(P(q−1)+p).

Second Embodiment

Figure 12:
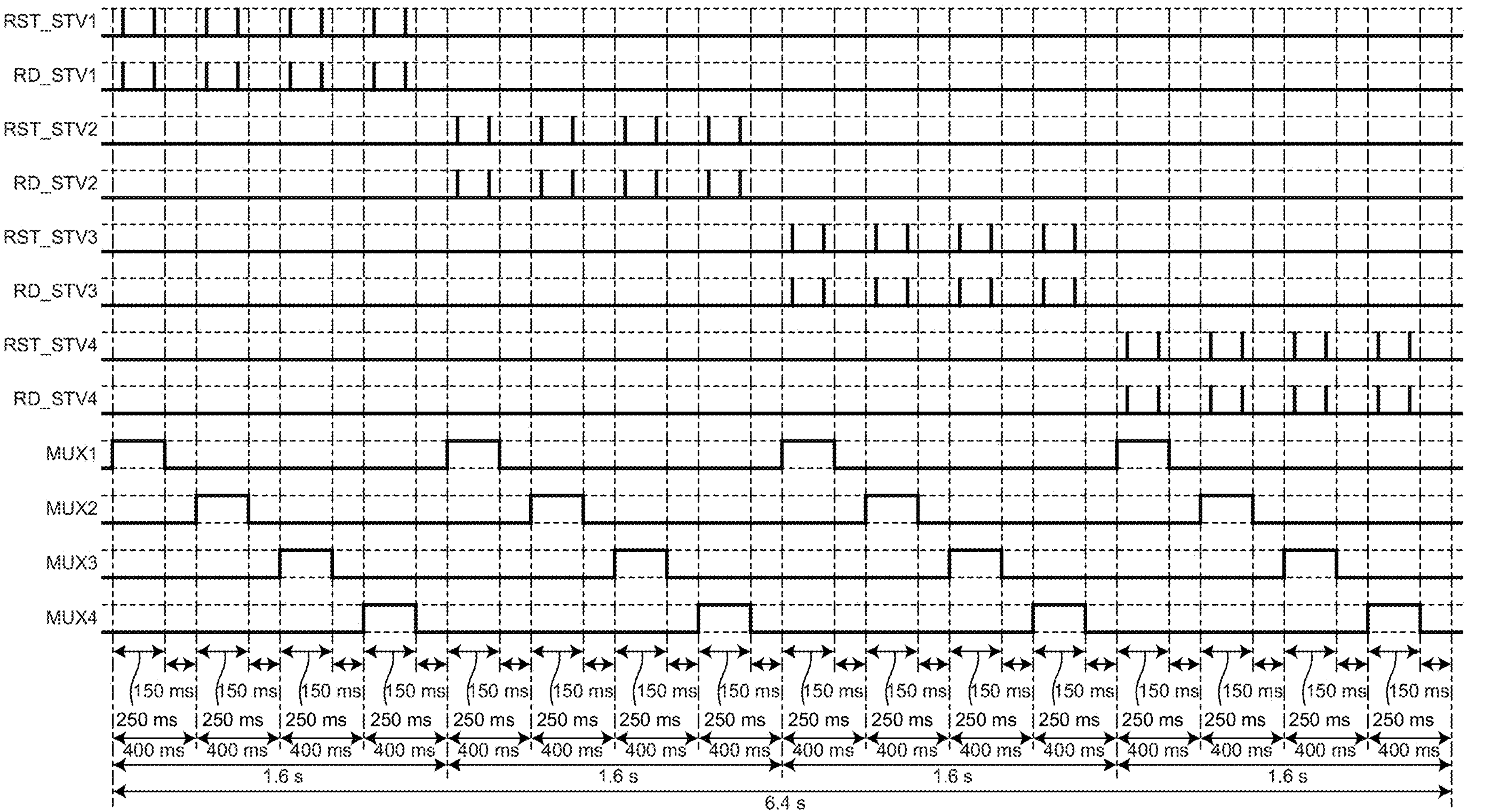
FIG. 12 is a timing diagram illustrating an example of the sensor value acquisition timing for one frame in the detection device according to the second embodiment.

FIG. 11 is a diagram illustrating an exemplary coupling configuration between the optical sensor and a detection circuit according to a second embodiment. FIG. 12 is a timing diagram illustrating an example of the sensor value acquisition timing for one frame in the detection device according to the second embodiment. The following describes a configuration and operations different from those of the first embodiment, and duplicate descriptions may be omitted.

In the coupling configuration illustrated in FIG. 11, a detection circuit 11*a* supplies reset start pulse signals RST_STV1, RST_STV2, RST_STV3, and RST_STV4 for the first gate line drive circuits 15AA1, 15AA2, 15AA3, and 15AA4 and the first gate line drive circuits 15AB1, 15AB2, 15AB3, and 15AB4, and read start pulse signals RD_STV1, RD_STV2, RD_STV3, and RD_STV4 for the second gate line drive circuits 15BA1, 15BA2, 15BA3, and 15BA4, and the second gate line drive circuits 15BB1, 15BB2, 15BB3, and 15BB4, that correspond to the detection blocks AA1, AA2, AA3, and AA4, respectively.

Specifically, the detection circuit 11*a* sequentially supplies the reset start pulse signals RST_STV1, RST_STV2, RST_STV3, and RST_STV4 and the read start pulse signals RD_STV1, RD_STV2, RD_STV3, and RD_STV4 by time-dividing the sensor value acquisition period for one frame illustrated in FIG. 12. Hereinafter, the time-division period during which the reset start pulse signals RST_STVo and the read start pulse signals RD_STVo are supplied is also referred to as the selection period of the detection block AAo (block selection period). In other words, in each of the selection periods of the detection blocks AAo (block selection period), the detection circuit 11*a* of the second embodiment selects the first gate line drive circuits 15AAo and 15ABo and the second gate line drive circuits 15BAo and 15BBo and supplies thereto the reset start pulse signals RST_STVo and the read start pulse signals RD_STVo.

In the coupling configuration illustrated in FIG. 11, the detection circuit 11*a* sequentially supplies the signal line selection signals MUX1, MUX2, MUX3, and MUX4 by time-dividing the selection period of the detection block AAo. Hereinafter, the period in which the signal line selection signal MUXp is high is also referred to as the selection period of the signal line SL(P(q−1)+p) (signal selection period).

After the reset start pulse signals RST_STVo are supplied to the first gate line drive circuits 15AAo and 15ABo and the read start pulse signals RD_STV are supplied to the second gate line drive circuits 15BAo and 15BBo in the selection period of the detection block AAo and the signal line SL(P(q−1)+p), the reset period Prst of the sensor pixels 3 coupled to the signal line SL(P(q−1)+p) in the detection block AAo starts. During the reset period Prst, the first gate line drive circuits 15AAo and 15ABo and the second gate line drive circuits 15BAo and 15BBo sequentially select the first gate lines (reset control scan lines GLrst) and the second gate lines (read control scan lines GLrd). This operation resets the potentials of the photodiodes 30 of the sensor pixels 3 coupled to the signal line SL(P(q−1)+p) in the detection block AAo.

After the reset start pulse signals RST_STVo are supplied to the first gate line drive circuits 15AAo and 15ABo and the read start pulse signals RD_STVo are supplied to the second gate line drive circuits 15BAo and 15BBo after the exposure period Pex has elapsed after the reset period Prst, the read period Pdet starts to read the sensor pixels 3 coupled to the signal line SL(P(q−1)+p) in the detection block AAo. During the read period Pdet, the first gate line drive circuits 15AAo and 15ABo and the second gate line drive circuits 15BAo and 15BBo sequentially select the first gate lines (reset control scan lines GLrst) and the second gate lines (read control scan lines GLrd), respectively, at predetermined timing. This operation reads the detection signals Vdet of the sensor pixels 3 coupled to the signal line SL(P(q−1)+p) in the detection block AAo.

The selection period P_MUX of the signal line SL(P(q−1)+p) that includes the reset period Prst, the exposure period Pex, and the read period Pdet described above is 250 ms, for example. The detection signal Vdet read in the read period Pdet is converted into the sensor value Raw for each of the sensor pixels 3 and stored in the buffer circuit 44 of the detection circuit 11.

In the data acquisition period P_D/O after the selection period P_MUX of the signal line SL(P(q−1)+p), the data acquisition circuit 71 of the control circuit 70 acquires the sensor value Raw for each of the sensor pixels 3 stored in the buffer circuit 44 of the detection circuit 11, and stores the sensor value Raw in the data storage circuit 72 in association with the positional information on the sensor pixel 3 in the detection block AA. The data acquisition period P_D/O is approximately 150 ms. As a result, the 1/16 frame period is approximately 400 ms.

The detection circuit 11 then switches the signal line that is selected by the signal line selection circuit 16 and performs the same detection operation. Thus, the sensor values Raw of the sensor pixels 3 in the detection block AAo selected by the selection signals B_SELo are acquired. The period for acquiring the sensor values Raw of the sensor pixels 3 in one detection block AAo is approximately 1.6 s.

By repeating this sequence of operations O times in one frame period (O is the total number of the detection blocks AAo, and herein, O=4), the sensor values Raw of the sensor pixels 3 in all the detection blocks AAo are acquired. The one frame period for acquiring the sensor values Raw of the sensor pixels 3 in all the detection blocks AAo is approximately 6.4 s.

After the sensor values Raw of the sensor pixels 3 in all the detection blocks AAo are acquired, the data processing circuit 73 reads the sensor values Raw of the respective sensor pixels 3 stored in the data storage circuit 72 and performs the process of combining the read sensor values Raw.

The image generation circuit 74 generates the image for one frame in the detection area AA based on the combined sensor values Raw and the positional information on the sensor pixels 3 in all the detection blocks AAo.

In the same manner as in the first embodiment, the configuration and the operations according to the second embodiment described above enable employment of a low-cost ROIC in which, for example, the number of the simultaneously coupleable signal lines (for example, approximately 256) is smaller than the number M (=1000) of the sensor pixels arranged in the first direction Dx, and the buffer size (number of buffers) (for example, approximately 256×256) is smaller than the total number M×N (=1000×250) of the sensor values Raw acquired in each of the selection periods of the detection blocks AAo (block selection period). Specifically, the number of input terminals of the ROIC coupleable to the signal lines only needs to be larger than the number of the simultaneously selected signal lines Q=M/P lines (=1000/4=250 lines). The buffer size (number of buffers) of the ROIC only needs to be larger than the total number of the sensor values Raw Q×N (=250×250) acquired in each selection period (signal selection period) of the signal line SL(P(q−1)+p).

While the preferred embodiments of the present disclosure have been described above, the present disclosure is not limited to the embodiments described above. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure. At least one of various omissions, substitutions, and changes of the components can be made without departing from the gist of the embodiments and the modifications described above.

What is claimed is:

1. A detection device comprising:

a planar detection device comprising a plurality of photodetection elements arranged in a planar configuration;

a light source device disposed so as to face the planar detection device; and a light-transmitting placement substrate that is disposed between the planar detection device and the light source device and configured to allow a plurality of objects to be detected to be placed thereon, wherein the planar detection device comprises:

a detection area in which a plurality of sensor pixels comprising the photodetection elements are arranged in a first direction and a second direction orthogonal to the first direction;

a drive circuit configured to simultaneously supply drive signals to the sensor pixels arranged in the first direction; and a selection circuit configured to select a detection signal for each of the sensor pixels arranged in the second direction; and a detection circuit configured to control the drive circuit and the selection circuit to acquire a sensor value for each of the sensor pixels, wherein the detection circuit is configured to acquire the sensor values by time-dividing one frame period into block selection periods corresponding to the detection blocks, wherein the detection area is divided in the second direction into a plurality of detection blocks, wherein the drive circuit is provided for each of the detection blocks, wherein each of the detection blocks are divided in the first direction into a plurality of middle blocks, wherein each of the middle blocks is divided in the first direction into a plurality of pixel column blocks each having the sensor pixels arranged in the second direction, wherein the selection circuit is configured to simultaneously select one pixel column block in each of the middle blocks of one of the detection blocks, wherein the detection circuit is configured to acquire sensor values by time-dividing each of a plurality of block selection periods into signal selection periods corresponding to the pixel column blocks simultaneously selected by the selection circuit, wherein the simultaneously selected pixel column blocks are selected sequentially starting from one of the pixel column blocks at one end to the other end of each of the middle blocks in the one of the detection blocks, and wherein the one of the detection blocks is sequentially selected starting from one of the detection blocks disposed at one end of the detection blocks to one of the detection blocks disposed at other end in the second direction, among the detection blocks in the detection area.

2. The detection device according to claim 1, wherein the drive circuit is configured to sequentially supply the drive signals to the sensor pixels arranged in the second direction based on a start pulse signal supplied from the detection circuit in each of the signal selection periods.

3. The detection device according to claim 2, wherein the detection circuit is configured to:

supply the start pulse signal, which is common to a plurality of the drive circuits, to the drive circuits, and supply a selection signal to enable any one of the drive circuits in each of the block selection periods.

4. The detection device according to claim 2, wherein the detection circuit is configured to select one of the drive circuits and supply the start pulse signal to the selected circuit in each of the block selection periods.

5. The detection device according to claim 1, wherein the detection circuit is configured as a readout integrated circuit (ROIC), and the number of terminals of the ROIC that are capable of receiving signals from the sensor pixels is larger than the number of the detection signals simultaneously selected by the selection circuit and smaller than the number of the sensor pixels arranged in the first direction in the detection area.

6. The detection device according to claim 5, wherein the number of buffers of the ROIC is larger than the number of the sensor values acquired in each of the signal selection periods and smaller than the number of the sensor values acquired in each of the block selection periods.

7. The detection device according to claim 6, wherein the sensor values are acquired from the ROIC in each of the signal selection periods, and an image in the detection area is generated by combining the sensor values acquired in the respective signal selection periods in the one frame period.

* * * * *